(12) United States Patent
Al-Eidan

(10) Patent No.: US 10,491,261 B1
(45) Date of Patent: Nov. 26, 2019

(54) MULTI CARRIER FREQUENCY MODULATION SPREAD SPECTRUM COMMUNICATION SYSTEM

(71) Applicant: Abdullah A. Al-Eidan, Bayan (KW)

(72) Inventor: Abdullah A. Al-Eidan, Bayan (KW)

( * ) Notice: Subject to any disclaimer, the term of this patent is extended or adjusted under 35 U.S.C. 154(b) by 0 days.

(21) Appl. No.: 15/479,898

(22) Filed: Apr. 5, 2017

Related U.S. Application Data

(63) Continuation of application No. 15/234,472, filed on Aug. 11, 2016, now abandoned, which is a
(Continued)

(51) Int. Cl.
*H04B 1/707* (2011.01)
*H04L 5/00* (2006.01)
(Continued)

(52) U.S. Cl.
CPC .......... *H04B 1/707* (2013.01); *H04B 7/0413* (2013.01); *H04B 17/336* (2015.01); *H04L 5/005* (2013.01);
(Continued)

(58) Field of Classification Search
CPC ........ H04B 1/69; H04B 1/707; H04B 1/7075; H04B 17/336; H04B 7/0413; H04H 20/33;
(Continued)

(56) References Cited

U.S. PATENT DOCUMENTS 5,241,562 A  8/1993  Partyka et al.
5,500,871 A  3/1996  Kato et al.
(Continued)

FOREIGN PATENT DOCUMENTS

JP   2012165252 A   8/2012

OTHER PUBLICATIONS

N. Yee and J.P.M.G. Linnartz, "Multi-Carrier in an indoor wireless radio channel", Memorandum UCB/ERL M94/6, U.C. Berkeley, (1994), http://www.eecs.berkeley.edu/PubsTrechRpts/1994/ERL-94-6.pdf.
(Continued)

*Primary Examiner* — Michelle M Koeth
(74) *Attorney, Agent, or Firm* — Westerman, Hattori, Daniels & Adrian, LLP

(57) ABSTRACT

A transceiver block for multi-user, duplex, wireless access system architecture called Multi Carrier Frequency Modulated Spread Spectrum System (MC FM SS). Here symbols are transmitted at multiple subcarriers where each subcarrier is FM or phase encoded with the data. The data is spread in time/bandwidth using a pseudo-random (PN) sequence. In one realization the transmission is performed with the guard ring carriers and/or pilot subcarriers of an Orthogonal Frequency and Code Division Multiplexing, OFDM, system carried on the main RF carrier. The MC FM SS transmits the data symbol over N subcarriers, with each subcarrier encoded in frequency or phase. In Variable Spreading Factor Orthogonal Frequency and Code Division Multiplexing, VSF OFDM, by DoCoMo Japan with 1024 (which can increase to e.g. 6144) carriers are proposed in Long Term Evolution (LTE) 4G system in the down link direction and 2 carriers MC DS CDMA are used in the uplink direction.

11 Claims, 29 Drawing Sheets

Related U.S. Application Data continuation of application No. 14/933,142, filed on Nov. 5, 2015, now abandoned.

(60) Provisional application No. 62/076,204, filed on Nov. 6, 2014.

(51) Int. Cl.
| | | |
|---|---|---|
| *H04B 17/336* | (2015.01) | |
| *H04L 27/18* | (2006.01) | |
| *H04L 5/14* | (2006.01) | |
| *H04B 7/0413* | (2017.01) | |
| *H04L 27/26* | (2006.01) | |

(52) U.S. Cl.
CPC .............. *H04L 5/0007* (2013.01); *H04L 5/14* (2013.01); *H04L 27/18* (2013.01); *H04L 27/265* (2013.01)

(58) Field of Classification Search
CPC ...... H04J 13/0022; H04L 5/007; H04L 5/005; H04L 5/14; H04L 27/18; H04L 27/265; H04L 5/0007
See application file for complete search history.

(56) References Cited

U.S. PATENT DOCUMENTS

| | | | | |
|---|---|---|---|---|
| 5,760,941 | A * | 6/1998 | Young | H04J 14/005 398/183 |
| 6,205,184 | B1 | 3/2001 | Al-Eidan | |
| 6,735,240 | B1 * | 5/2004 | Kang | H04B 1/7117 370/335 |
| 7,027,505 | B2 | 4/2006 | Al-Eidan | |
| 7,653,152 | B2 | 1/2010 | Al-Eidan | |
| 7,864,900 | B2 | 1/2011 | Al-Eidan | |
| 8,995,559 | B2 * | 3/2015 | Palanki | H04L 5/0053 375/148 |
| 9,124,345 | B2 * | 9/2015 | Chen | H04B 1/0007 |
| 2002/0009125 | A1 * | 1/2002 | Shi | H04B 1/69 375/139 |
| 2002/0191676 | A1 * | 12/2002 | Kenneth | H04J 13/00 375/130 |
| 2005/0220173 | A1 * | 10/2005 | Zyren | H04B 1/715 375/130 |
| 2005/0281318 | A1 * | 12/2005 | Neugebauer | H04B 1/707 375/134 |
| 2006/0209814 | A1 * | 9/2006 | Fujii | H04B 7/0678 370/369 |
| 2007/0291860 | A1 * | 12/2007 | Wang | H04L 1/0071 375/260 |
| 2008/0118002 | A1 * | 5/2008 | Fonseka | H04L 27/2025 375/298 |
| 2009/0245329 | A1 * | 10/2009 | Bocquet | H04W 52/34 375/146 |
| 2010/0009641 | A1 * | 1/2010 | Osman | H04B 1/036 455/102 |
| 2010/0022189 | A1 * | 1/2010 | Coker | H04H 20/33 455/41.3 |
| 2013/0142218 | A1 | 6/2013 | Moradi et al. | |
| 2014/0044009 | A1 * | 2/2014 | Piesinger | H04W 56/001 370/254 |
| 2014/0056333 | A1 * | 2/2014 | Neff | H04B 1/7073 375/149 |
| 2014/0177756 | A1 * | 6/2014 | Park | H04L 27/3405 375/298 |
| 2015/0009874 | A1 * | 1/2015 | Edara | H04W 52/0225 370/311 |
| 2015/0023235 | A1 * | 1/2015 | Lightstone | H04W 52/0206 370/311 |
| 2015/0156004 | A1 * | 6/2015 | Khandani | H04L 5/1423 370/278 |

OTHER PUBLICATIONS

"A condensed review of spread spectrum techniques for ISM band systems," AN9820.1, May 2000, http://www.qsl.net/n9zia/pdf/AN9820.pdf.

Edwin H. Armstrong, "A method of reducing disturbances in radio signaling by a system of frequency modulation," Proceedings of the institute of Radio Engineers, vol. 24, No. 5, May 1936.

N. Yee, J.P.M.G. Linnartz and G. Fettweis, "Multi-Carrier CDMA in indoor wireless Radio Networks", IEEE Personal Indoor and Mobile Radio Communications (PIMRC) Int. Conference, Sep. 1993, Yokohama, Japan, pp. 109-113.

J. P. M. G. Linnartz, "Performance Analysis of Synchronous MC-CDMA in Mobile Rayleigh Channels with Both Delay and Doppler Spreads," IEEE VT, vol. 50, No. 6, Nov. 2001, pp. 1375-1387.

Hughes Software Systems, Multi Carrier Code Division Multiple Access, Mar. 2002.

German Aerospace Center, Institute of Communications and Navigation, "History of Multi-Carrier Code Division Multiple Access (MC-CDMA) and Multi-Carrier Spread Spectrum Workshop", Nov. 2006, Wireless Communication Reference Web Site, section about MC-CDMA, 2001.

* cited by examiner

Rate and period of FM and FM-DSSS signals

MULTI CARRIER FREQUENCY MODULATION SPREAD SPECTRUM COMMUNICATION SYSTEM

CROSS-REFERENCE TO RELATED APPLICATIONS

The present patent application is a Continuation of U.S. application Ser. No. 14/933,142, filed Nov. 5, 2015, which is based on, and claims priority from, U.S. provisional Application No. 62/076,204, filed Nov. 6, 2014, which is incorporated herein by reference in its entirety.

ACRONYMS AND ABBREVIATIONS

Acronyms and abbreviations used herein are listed in the following table:

Acronym/Abbreviation Full Term
ASIC Application Specific Integrated Circuits
ASK Amplitude-Shift Keying
BB Baseband
BB DSP Base Band Digital Signal Processor
BFP Band Pass Filter
BPSK Binary Phase Shift Keying
CDMA Code Division Multiple Access
CPFSK Continuous Phase Frequency Shift Keying
CSMA/CA Carrier Sense Multiple Access With Collision Avoidance
CW Continuous Wave Operation
DDS Direct Digital Frequency Synthesis
DL Down Link
Acronym/Abbreviation Full Term
DSL Digital Subscriber Line
DSSS Direct-Sequence Spread Spectrum
FM Frequency Modulation/Modulated
FM SS Multi Carrier Frequency Modulated Spread Spectrum
FSK Frequency Shift Keying
GFSK Gaussian Filter Fsk
GMSK Gaussian Minimum Shift Keying
GSM Global System for Mobile (communications)
ICI Intercarrier Interference
IFFT Inverse Fast Fourier Transform
ISI Intersymbol Interference
LTE Long Term Evolution
MC FM SS Multi Carrier Frequency Modulated Spread Spectrum System
MIMO Multiple Input Multiple Output
NBFM SSB Narrow Band Frequency Modulation Single Side Band
MSK Minimum Shift Keying
OFDM Orthogonal Frequency Division Multiplexing
OOK On-Off Keying
OQPSK Offset Quadrature Phase-Shift Keying
PG Processing Gain
PLL Phase-Locked Loop
Acronym/Abbreviation Full Term
PN Pseudo-Noise
PSD Power Spectral Density
PSK Phase Shift Keying
QAM Quadrature Amplitude Modulation
QPSK Quadrature Phase Shift Keying
RC Radio Controlled
RF Radio Frequency
RFID Radio Frequency Identification
SNR Signal-To-Noise Ratio
SQPSK Staggered Quadrature Phase Shift Keying
SSB Single Side Band
UMTS Universal Mobile Telecommunications System
UL Up Link
VCO Voltage Controlled Oscillator
VHDL Very high speed integrated circuit Hardware Description Language
VSF OFDM Variable Spreading Factor Orthogonal Frequency And Code Division Multiplexing
W-CDMA Wideband Code Division Multiple Access
WiMAX Worldwide Interoperability for Microwave Access

BACKGROUND OF THE INVENTION

1. Field of the Invention

The present invention relates to coding and modulation of communication platforms. More specifically, the invention relates to a Multi Carrier Frequency Modulated Spread Spectrum ("FM SS") Communication System that uses different modulation techniques in coding digital and analog data for communication and control.

An FM SS transceiver/modem combines frequency and time spreading of data/control information on several subcarriers to enhance the capacity and performance of VSF OFDM ("Variable Spreading Factor Orthogonal Frequency and Code Division Multiplexing") communication system. The deployment of two parallel transceivers (OFDM and FM SS) in the wireless communication system allows the realization of additional functions in a smart phone. The functions range is large from high data rate OFDM modem control, smart power grid control, addressable network appliances (network of things), WiMAX, Super High Definition TV (4 k TV), security Systems, RFID, games and toys. The spread-spectrum system designs allow several users and transceivers to communicate while sharing the same bandwidth and utilizing the frequency spectrum efficiently. This application describes a communication design block (IP) suitable for integration in high data rate cellular communication system.

2. Description of Related Art Including Information Disclosed Under 37 CFR §§ 1.97 and 1.98

In Frequency Modulation the information (the intelligence) is in the carrier while the RF carrier has a constant envelope. Digital communication systems are realized by coding/decoding digital data as phase or frequency variation in the transceiver. In the transmission phase, the information which is the modulating signal is in digital format and the modulation process is voltage to frequency/phase conversion. In the receiving phase the phase, frequency detection is performed, which is frequency/phase to voltage conversion, to extract the original digital signal.

Modulation is the process of encoding information from a message source in a manner suitable for transmission. The ultimate goal of a modulation technique is to transport the message signal through a radio channel with the best possible quality while occupying the least amount of radio spectrum. FM ("frequency modulated") transceivers (FSK, differential FSK, GMSK and OFDM) and QPSK, PSK ("phase shift keying") transceivers are used for communication, control and telemetry applications. In this invention multiple orthogonal frequency pairs are used in SS data representation and the data modulation is performed by subcarrier frequency, phase shifts.

The different encoding and data modulation techniques applicable to the proposed communication platform are reviewed herein.

The Direct-Sequence Spread Spectrum (DSSS) method is a modulation and multiple access technique. The message signal is multiplied with a pseudorandom sequence which spreads the time domain message over the larger bandwidth, hence making its power density lower than the noise power. Hence it is difficult to intercept, detect, and demodulate/decode the message signal directly without knowledge of the unique Chip/PN ("pseudo-noise") code. Only at the receiver, with appropriate PN sequence, message signals can be decoded. Each Subscriber will have a unique PN sequence/code as shown in FIG. 1.

As with other spread spectrum technologies, the transmitted signal takes up more bandwidth than the information signal that modulates the carrier or broadcast frequency. The name 'spread spectrum' means that the carrier signals occur over the full bandwidth (spectrum) of a device's transmitting frequency. DSSS phase-modulates a sine wave pseudo randomly with a continuous string of Pseudo-Noise (PN) code symbols called "chips," each of which has a much shorter duration than an information bit. That is, each information bit is modulated by a sequence of much faster chips. Therefore, the chip rate is much higher than the information signal bit rate. DSSS uses a signal structure in which the sequence of chips produced by the transmitter is already known by the receiver. The receiver can then use the same PN sequence to counteract the effect of the PN sequence on the received signal in order to reconstruct the information signal.

Direct-sequence spread-spectrum transmissions multiply the data being transmitted by a "noise" signal. This noise signal is a pseudorandom sequence of (1) and (−1) values, at a frequency much higher than that of the original signal. The resulting signal resembles white noise, like an audio recording of "static". However, this noise-like signal can be used to exactly reconstruct the original data at the receiving end, by multiplying it by the same pseudorandom sequence (because 1×1=1 and −1×−1=1). This process, known as "de-spreading," mathematically constitutes a correlation of the transmitted PN sequence with the PN sequence that the receiver believes the transmitter is using. The resulting effect of enhancing signal to noise ratio on the channel is called process gain. This effect can be made larger by employing a longer PN sequence and more chips per bit, but physical devices used to generate the PN sequence impose practical limits on attainable processing gain.

The advantage of DSSS spreading is that it reduces frequency selective fading. It allows base stations in cellular networks to use the same frequency range. Allows several base stations to detect and recover the signal, and enables soft handover. The disadvantage of this technique is that precise power control is necessary.

The mathematics of the spreading code is as follows:

Ck must be unique for each user. Ideally, they are orthogonal to one another, i.e., <Ci, Ck>=0, unless i=k
<Ci, Ck>=J, if i=k Example: Walsh Codes For a spreading factor J=4, there are 4 Walsh codes.
In general there are always J Walsh codes, as long as J=2, 4, 8, 16, 32, 64, 128, . . . .
An example of 4-Array Walsh codes is:

$$\begin{matrix} C1 & & 1 & 1 & 1 & 1 \\ C2 & = & 1 & -1 & 1 & -1 \\ C3 & & 1 & 1 & -1 & -1 \\ C4 & & 1 & -1 & -1 & 1 \end{matrix}$$

If an undesired transmitter transmits on the same channel but with a different PN sequence (or no sequence at all), the de-spreading process results in no processing gain for that signal. This effect is the basis for the Code Division Multiple Access (CDMA) property of DSSS, which allows multiple transmitters to share the same channel within the limits of the cross-correlation properties of their PN sequences. As this description suggests, a plot of the transmitted waveform has a roughly bell-shaped envelope centered on the carrier frequency.

DSSS systems spread the bandwidth of an information stream to a much wider Bandwidth and lower the power spectral density (PSD) accordingly. As a result of PN codes, a spread signal has a noise-like quality. The transmit spread signal from an additional user causes a slight rise in the noise floor to the current users in the channel. The degradation of the performance of the receivers due to this additional power from the transmitter ultimately limits the system capacity. This is the most important characteristic of the W-CDMA system. Power becomes the common shared resource for users. The interference power is shared between the mobile terminals in the cell and each terminal contributes to the interference. Radio resource management allocates power to each user such that the maximum interference is not exceeded. The system can easily add a user on the spectrum until the interference becomes intolerable. This is the real advantage of the W-CDMA. In cellular terms, frequency reuse is one. Everyone shares all the frequencies and the interference is uniformly spread over all the users.

In one implementation the radio of the FM SS system is designed for 128 Kbps data rate and 4.096 Mcps chip rate (spreading code rate). The ratio of the chip rate to the data rate defines the Processing Gain (PG) of the system. The PG for the specified chip rate and data rate of the radio is 32 or 15 dB.

$PG=10 \log \{R_{chip}/R_{data}\}$ dB $PG=4096/128=32=15$ dB

The channel bandwidth is given by:

$BW_{ss}=(1+a) \times R_{chip}$ Hz

Where a=0.22: is the roll-off factor of the square-root raised cosine filter.

The channel bandwidth is found to be 4.997 MHz, i.e., approximately 5 MHz, for $R_{chip}$=4.096 Mcps.

In another implementation the FM DSSS system is designed for 16 Kbps data rate and 32 Mcps chip rate (spreading code rate). This corresponds to PG=2048 or 33 dB.

The use of a pulse shaping filter conserves the channel bandwidth. The square root raised cosine filter satisfies the Nyquist criterion such that the introduction of the pulse shaping does not cause intersymbol interference. Rectangular pulses without shaping require the channel bandwidth to be double that of the pulse rate. However, if rectangular pulses are shaped with the filter, the channel bandwidth is 22% higher than the pulse (chip) rate.

There are many variations of FSK, including 4-ary FSK, which requires two bits to describe each frequency (sometimes called tones), and it is customary to call each two-bit word a channel symbol.

On-Off Keying (OOK) is the simplest form of Amplitude-Shift Keying (ASK) modulation that represents digital data as the presence or absence of a carrier wave. In its simplest form, the presence of a carrier for a specific duration represents a binary one, while its absence for the same duration represents a binary zero. Some more sophisticated schemes vary these durations to convey additional information. On-off keying is most commonly used to transmit Morse code over radio frequencies (referred to as CW (Continuous Wave Operation). OOK is more spectrally efficient than frequency-shift keying, but more sensitive to noise. In addition to RF ("radio frequency") carrier waves, OOK is also used in optical communication systems.

Frequency or phase or amplitude changes in the time domain (e.g. FSK) make sidebands in the frequency domain. If those frequency changes are made abruptly, the sidebands are farther away and stronger, and hence result in reduced spectral efficiency. If these transitions are made slowly, then the sidebands are weaker and not so far away and therefore better spectral efficiency is achieved. GFSK modulation (Gaussian Filter FSK) uses smooth transitions from −1 and 1 before modulating the carrier to reduce abrupt transitions and thus reducing the energy in the sidebands and improve spectral efficiency.

FSK is not two frequencies added together, but rather convoluted with time varying binary data. RF bandwidth and data rate are related by the modulation format. Different modulation formats will require different bandwidths for the same data rate. Bandwidth is the difference between the upper and lower frequencies of a given piece of spectrum and is measured in Hz. This is essentially the amount of space available to transmit data through the air.

In an FSK scheme the bandwidth produced is a function of the highest base band frequency including harmonics and the modulation index, which is:

$$m=\Delta f(T)=df(T)$$

Where $\Delta f$ or $df$ is the frequency deviation or shift between the one and zero frequencies, or:

$$\Delta f=f1-f2=df$$

$$BW=df+r$$

where BW is the band width, and r=bit rate=2×maximum base band square wave frequency.

T is the bit time interval of the data or the reciprocal of the data rate (1/bit/s).

For analog signal FM modulation, the bandwidth is approximately 2×(df+fm) where df is the maximum frequency deviation and fm is the modulating frequency. FSK is basically digital FM where the input data is the Baseband signal (BB) signal as an encoded square wave. The highest frequency component of a binary bit sequence transmitted serially occurs when the sequence is 01010101. This frequency component is one half of the bit rate. Baud rate is the number of symbols that can be transmitted over a line in a second. This is similar to bit rate except when each symbol consists of more than 1 bit. So in a system with 3 bit symbols (or frequency) operating at 1000 baud will have a 3000 bit/s bit rate. Channel capacity is the maximum data rate that can be carried over a certain medium given several factors including the bandwidth available. Higher bandwidth will result in greater the channel capacity.

The BW is bigger than df, because whenever the frequency is changed, extra frequency components are generated. Switching between frequencies more often (higher data rate) results in more power in these extra frequency components. Now, these can be filtered out to some extent. If the filter is narrower than $\Delta f+r$, then the result will be too distorted waveform to reliably extract the original bit stream.

Frequency, phase or amplitude changes in the time domain make sidebands in the frequency domain. If transitions among those frequencies change abruptly, the sidebands are farther away and stronger, and hence reduced spectral efficiency results. If the transitions are made slowly, then the sidebands are weaker and not so far. For FSK, the bit rate and the symbol rate are the same. But for higher order modulations like QPSK and QAM, each transmitted symbol can code for more than one bit so the bit rate can be significantly higher than the symbol rate. This means that the required transmit bandwidth is less than what would be required for AM or FSK. QPSK and QAM have higher spectral efficiency. However, QPSK and QAM are more susceptible to noise and distortion and therefore require a relatively higher SNR ("signal-to-noise ratio").

Also, for FSK, the pair of frequencies or the two frequencies need to be integer multiples of the data rate. This will result in an integer number of cycles in each bit period so that the carrier always ends up at the same level on data bit transitions (continuous phase FSK, CPFSK). This probably won't be done at RF, though. Generally the FSK signal would be generated at an intermediate frequency which would then be mixed up to the actual RF carrier frequency.

Binary Phase Shift Keying (BPSK) demonstrates better performance than Amplitude Shift Keying (ASK) and Frequency Shift Keying (FSK). PSK employs zero phase for logical state 1 and 180 degrees phase shift for logical state 0. PSK can be expanded to an M-ary scheme, employing multiple phases and amplitudes as different states. Filtering can be employed to avoid spectral spreading. Quadrature Phase Shift Keying is effectively two independent BPSK systems (I and Q), and therefore exhibits the same performance but twice the bandwidth efficiency. Quadrature Phase Shift Keying can be filtered using raised cosine filters to achieve excellent out of band suppression. Large envelope variations occur during phase transitions, thus requiring linear amplification, which is a disadvantage from power consumption point of view. QPSK can encode two bits per symbol, with Gray coding to minimize the BER twice the rate of BPSK. The odd bits, contribute to the in-phase component (I). The even bits, contribute to the quadrature-phase component (Q). The transmitted signal is a combination of I and Q. Ideally amplitude of QPSK signal is constant. However, if pulses are shaped, then the constant envelope is lost and phase shift of pi radians causes the waveform to go to zero briefly. These envelope variations force the use of less efficient linear amplifiers in RF stage. In summary, Q Phase Shift Keying (QPSK) is used in UMTS, as it provides a highly bandwidth efficient modulation scheme.

If the I and Q bit streams are offset by half a bit interval, then the amplitude variations are minimized since phase never changes by 180 degrees. Offset quadrature phase-shift keying OQPSK is a variant of Phase Shift Keying modulation using 4 different values of the phase to transmit. OQPSK is obtained from QPSK by delaying the odd bit stream ½ bit w.r.t. even bit stream. It is sometimes called Staggered quadrature phase shift keying SQPSK. OQPSK limits the phase-jumps that occur at symbol boundaries (every bit rate period, Tb/sec) to no more than 90 degree (phase changes of +/−pi/2), and reduces the effects on the amplitude of the signal due to any low-pass filtering. As a result smaller envelope variations occur as compared to that observed in QPSK envelope/wave form. Therefore OQPSK has reduced linearity specifications on the RF stages. The Disadvantages of OQPSK are: (1) OQPSK introduces a delay of half a symbol into the demodulation process. In other words, using OQPSK increases the temporal efficiency of normal QPSK. The reason is that the in phase and quadrature phase components of the OQPSK cannot be simultaneously zero. Hence, the range of the fluctuations in the signal amplitude is smaller. (2) An additional disadvantage is that the quiescent power is nonzero, which may be a design issue in devices targeted for low power applications.

QPSK, modulation is very robust, but requires some form of linear amplification. OQPSK and p/4-QPSK can be implemented, and reduce the envelope variations of the signal. High level M-ary schemes (such as 64-QAM) are very bandwidth efficient, but more susceptible to noise and require linear amplification.

All of the modulation techniques discussed thus far involve a single radio carrier. Another class of modulation techniques, called multicarrier modulation, employs multiple simultaneous modulated carriers. A particular form of multicarrier modulation, called orthogonal frequency division multiplexing (OFDM), is used in IEEE 802.11a and 802.11g, WiMAX, and several international terrestrial video broadcast standards. In the U.S., the MediaFLO video service offered on Verizon and Cingular cell phone networks employs a form of OFDM.

OFDM is a kind of multicarrier modulation with orthogonality among subcarriers (FIG. 8).

OFDM splits a high-rate data stream into a number of lower rate streams.

Data streams are transmitted simultaneously over a number of subcarriers.

A transmitter and receiver block diagram is shown in FIG. 9.

The system spreads each user symbol in the frequency domain. That is, each user symbol is carried over multiple parallel subcarriers, but it is phase shifted (typically 0 or 180 degrees) according to a code value. The code values differ per subcarrier and per user. The receiver combines all subcarrier signals, by weighing these to compensate varying signal strengths and undo the code shift. The receiver can separate signals of different users, because these have different (e.g. orthogonal) code values.

Since each data symbol occupies a much wider bandwidth (in Hertz) than the data rate (in bit/s), a signal-to-noise-plus-interference ratio (if defined as signal power divided by total noise plus interference power in the entire transmission band) of less than 0 dB is feasible.

OFDM is an efficient way to deal with multipath fading channels.

The data rate per subcarrier can be adaptively changed according to SNR.

OFDM is robust against narrow band interference

FIG. 9 represents the BB ("baseband") data by a random data generator (step 91). The encoder is a delay and adds convolution encoding (step 92).

Zero padding (step 93) is required to set a constant size input to the Inverse Fast Fourier Transform (IFFT).

Interleaving (step 94) functions to spread the bits out in time to protect the important bits, from a block of source data.

The OFDM sub-carriers are modulated at step 95 by using BPSK or QPSK or 16-QAM or 64-QAM modulation, depending on the rate requested At step 96, the modulated data is modified in special form to force the outputs of the IFFT to be real numbers not imaginary.

Inverse Fast Fourier Transform (IFFT) is used at step 97 to find the corresponding time waveform Cyclic Extension (step 98) eliminates Intercarrier Interference (ICI)

In Preamble step 99, groups of bits are added to specify the beginning of the data, and to make synchronization and channel estimation.

In step 910, a filter filters the data using raised cosine pulse shaping filter. A raised cosine filter belongs to class of filters which satisfy the Nyquist criterion.

A channel 911 is the path of the transmitted signal to the receiver. A channel model allows the signal to noise ratio to be controlled. The signal to noise ratio is set by adding a known amount of white noise to the transmitted signal.

In sampling step 912, the input signal is checked for high power, which indicates the beginning of received data. The data is filtered before sampling it. By sampling the received filtered data we are now ready to check the preamble.

Steps 913-919 are receiver steps that perform the reverse of the operations described with respect to steps 91-912.

OFDM is now widely used for wireless data, just not on cellular networks. The reason is driven mostly by bit rate. Today's wireless data services require high bit rates to emulate the quality of service found in landlines, e.g., DSL ("digital subscriber line") and cable. Spread spectrum systems operate at high chip rates, but process gain turns the high chip rate into a more modest bit rate. The cellular carriers are doing innovative things with CDMA to boost bit rates over 2 Mb/s, but today's Wi-Fi radios already operate as high as 54 Mb/s (over short distances).

One of the toughest impairments to overcome is a smearing in time of consecutive channel symbols called delay spread. Delay spread is a consequence of multipath fading. Modern narrowband radios mitigate the effects of delay spread through the use of adaptive equalizers. An adaptive equalizer continuously measures the time-varying impulse response of the channel and attempts to correct it to a flat frequency response across the channel bandwidth. However, 802.11 radios currently operating at 4.9 GHz are broadband, and equalizers for broadband channels are considered by many to be either impractical or ineffective. Instead, IEEE 802.11 radios use OFDM. IEEE 802.11a and 802.11g radios employ OFDM with 64 carriers. Of these, 48 are used for transporting user data, and four are pilot carriers used for synchronization. Twelve additional carriers exist in an algorithmic sense, but have no power. They are needed to ensure the total number of carriers is a power of 2. Each carrier is narrow enough that the designer assumes the frequency response is flat; therefore, no ISI ("intersymbol interference") should occur.

802.11g radios employ algorithms for automatically adjusting the instantaneous bit rate to the measured channel conditions. The bit rate is adjusted by varying both the signal constellation and the code rate of an error-correcting code. A time-varying multipath fading channel will put greater stress on the receiver, and performance will generally be worse for the same average signal-to-noise ratio.

While the term "multiplexing" appears in its name, OFDM is not by itself a multiple access scheme. Instead, 802.11a and 802.11g both use a multiple access method called carrier sense multiple access with collision avoidance (CSMA/CA). In this protocol, the station receiver listens to the channel for a period of time to determine whether another station is transmitting. If the channel is busy, all other stations must wait a random period of time before checking the channel again. If the channel is clear, a station may transmit. This is not the case in the proposed OFDM 4G applications.

The advantages and disadvantages of OFDM and DSSS modulation techniques are shown on Tables 1 and 2.

TABLE 1

Direct Sequence Spread Spectrum versus OFDM advantages.

| DSSS ADVANTAGES | OFDM ADVANTAGES |
| --- | --- |
| Higher capacity over TDMA and FDMA. | Immune to frequency-selective multipath fading than single carrier transmission. |
| Internal addressing System using orthogonal codes | Highest capacity and efficiency in using the frequency band. |
| Better security than other Modulation techniques | Easily implemented using FFT ("Fast Fourier Transform"). |

TABLE 2

Direct Sequence Spread Spectrum versus OFDM disadvantages.

| DSSS DISADVANTAGES | OFDM DISADVANTAGES |
| --- | --- |
| Multipath fading. | High sensitivity to frequency offsets and waveform variation. |
| MAI (Multiple Access Interference). | ICI (Intercarrier Interference) |
| ISI (Inter-Symbol Interference). | No addressing. |
|  | Not secure. |

BRIEF SUMMARY OF THE INVENTION

The present invention is directed to a transceiver block for multi-user, duplex, wireless access system architecture called Multi Carrier Frequency Modulated Spread Spectrum System (MC FM SS). Here symbols are transmitted at multiple subcarriers where each subcarrier is FM or phase encoded with the data. The data is spread in time/bandwidth using on pseudo-random (PN) sequence. In one realization the transmission is performed with the guard ring carriers and/or pilot subcarriers of an Orthogonal Frequency and Code Division Multiplexing, OFDM, system carried on the main RF carrier. The MC FM SS transmits the data symbol over N subcarriers, with each subcarrier encoded in frequency or phase. In Variable Spreading Factor Orthogonal Frequency and Code Division Multiplexing, VSF OFDM, by DoCoMo Japan with 1024 (which can increase to e.g. 6144) carriers are proposed in Long Term Evolution (LTE) 4G system in the down link direction and 2 carriers MC DS CDMA are used in the uplink direction.

Here an addition to the Long Term Evolution (LTE) 4G/5G system is proposed. A separate novel MC FM SS duplex modem to perform channel estimation, adaptive power allocation, OFDM pilot synchronization and other functions using the estimated 25% of OFDM subcarriers assigned for guard ring and/or pilot subcarriers (the first and last 125 carriers). The remaining sub-carriers are the OFDM data subcarriers for down link data symbol transmission. This addition to the LTE 4G communication system results in reduced or lower power consumption in the base station and the handset.

FM modulation of subcarriers is implemented based on the binary state e.g. with 0 (the subcarrier is suppressed on-off keying) or encoded with frequency shift keying, df, or displaced to an adjacent orthogonal frequency. In one implementation the platform utilizes Narrow Band Frequency Modulation Single Side Band (NBFM SSB), i.e., (carrier+delta FM) frequency for data transmission. Depending on the application, the FM energy is transmitted directly on an RF carrier, or FM modulation is preceded by or followed by the spread spectrum operation before transmission. Here the FM transceiver output channels are spread using different orthogonal or non-orthogonal random codes. Either the FM or phase modulation of subcarriers, e.g. BPSK and QPSK, are compatible with IFFT/FFT algorithm processing of the OFDM system. The FM transceiver/co-processor encodes digital data while using the frequency spectrum efficiently by using continuous-phase frequency-shift keying or using low index of modulation FM, CPFSK or on-off keying (OOK). The MC FM SS and the VSF OFDM transceivers can operate concurrently using different subcarrier frequencies within the assigned OFDM channel bandwidth.

The MC FM SS architecture is a Frequency Division Duplex (FDD) System. FDD allows a simultaneous two-way communication by employing two separate frequency channels. Frequency-division duplexing (FDD) means that the transmitter and receiver operate at different carrier frequencies. The platform must be able to send and receive a transmission at the same time. The Frequency Modulation Spread Spectrum Intellectual Property (FM-SS IP) can be integrated in frequency division multiple access system (FDMA). FDMA means that a number of two-way communications can be conducted simultaneously by assigning each communication to a different duplex pair.

The proposed Frequency modulated spread spectrum (FM)-spread spectrum (SS) communication platform is a configurable intellectual property (IP) (i.e., programmable with selectable carriers and adjustable modulation parameters) designed for application in indoor wireless systems or as 4G mobile wireless communication devices. This IP may be integrated in an "Application Specific Integrated Circuits (ASIC)" for different wireless applications. In the down link direction the MC FM SS operates similar to Multi-Carrier Code Division Multiple Access (MC-CDMA) which is a multiple access scheme proposed for OFDM-based telecommunication systems, allowing the system to support multiple users at the same time. MC-CDMA systems were shown to be capable of 5 Gigabit/s transmissions to receivers travelling at 10 km/h achieving 4G class performance in a 100 MHz-wide channels.

The FM SS IP hardware/physical implementation based on Digital Signal Processor (DSP) implementation of frequency/phase modulator and demodulator. The FM SS channel carrying capacities are different depending on the assigned bandwidth and the utilization of orthogonal or non-orthogonal SS codes for time and frequency channel spreading, i.e., one or two dimensional spreading.

Frequency modulated (FM) and SS communication systems offer different advantages. The purpose of this invention is to combine these advantages in one communication system including using nonlinear power amplifiers at the base station and terminals as the carrier amplitude is constant.

The Frequency modulated Direct Sequence Spread Spectrum (FM DSSS) system architecture in mobile terminals can be used in Super High Definition TV Systems (4K Digital TV), direct audio communication, WiMAX, video conferencing, Personal computer, PC, interface and FM automation of house or office appliance, RC ("radio controlled") toys/game control, garage door opener, wireless access control, phone security, RFID scanner. In one implementation these functions are provided by a separate FM output to a separate internal or external antenna for direct communication.

The low modulation index FM processor (NBFM modulator) can be implemented by Direct Digital Frequency Synthesis Architecture (DDS) and acts as a co-processor to the Base Band Digital Signal Processor (BB DSP). The processor provides very fast frequency change with fine steps, excellent phase noise, transient-free (phase continuous) wave forms, flexibility, and small size.

In one aspect of the present invention, the FM SS Communication System in accordance with the present invention uses Continuous Phase Frequency Shift Keying, CPFSK, or Minimum Shift Keying (MSK) to transmit digital data on one or several subcarriers. It is also an aspect of the FM SS Communication System according to the present invention to utilize spread spectrum modulator to generate a signal covering bandwidth much wider than the data rate. In one realization, M-ary FSK modulator is used with several pairs of frequencies to represent digital data efficiently, i.e., more bits per frequency, (higher order FM is encoded, e.g., a single frequency may represent 2-4 bits).

In another aspect of the present invention, the FM SS Communication System uses either a Direct Sequence or frequency hopping technique to transmit digital data on one or several sub carriers.

In still another aspect of the present invention, the FM SS Communication System includes one or more FM SS transceivers capable of sequential or concurrent operation.

In still another aspect of the present invention, the FM SS Communication System includes one or more spread spectrum transceivers whose outputs are coupled and transmitted over one or multiple carriers, has one or more receivers for de-spreading received codes to generate data and BB signal. The base station is equipped with an equivalent system.

In still another aspect of the FM SS Communication System according to the present invention, the FM SS Communication System provides multi-user, duplex, wireless access.

In still another aspect of the FM SS Communication System according to the present invention, symbols are transmitted at multiple subcarriers, where each subcarrier is FM or phase encoded with the data using Quadrature Modulators. To avoid deep fades over entire signal bandwidth spread spectrum circuits are added to the communication platform.

In still another aspect of the FM SS Communication System according to the present invention, the FM modulation of subcarriers is implemented based on the binary state e.g. with 0 (the subcarrier is suppressed-On-Off Keying) or encoded with CPFSK or displaced to an adjacent orthogonal frequency. in one implementation the platform utilizes (SSB) Single Side Band, i.e., (carrier+delta FM) frequency for data transmission.

In still another aspect of the present invention, a Multi-Carrier (MC) FM SS Communication System uses multiple subcarriers and multiple IF carriers for data communication.

In still another aspect of the MC FM SS Communication System according to the present invention, there is appropriate separation between FM frequencies and maximum frequency deviation that maintains the modulated energy concentrated around the carrier.

In still another aspect of the present invention, the MC FM SS Communication System uses low index of modulation to produce narrow band FM with minimum side band energies e.g. 0.5 for MSK.

In still another aspect of the present invention, the MC FM SS Communication System uses multiple receivers that work with one or multiple carriers. An MC FM SS receiver which uses non-coherent binary FSK demodulator and square law detector.

In still another aspect of the present invention, the MC FM SS Communication System utilizes FSK, differential FSK, GMSK or OFDM modulation on multiple frequencies. The differential FSK transceiver transmits the difference between current data and the highest bit rate clock and/or its compliment.

In still another aspect of the present invention, an MC FM SS Communication System with multiple transceivers is provided, that uses multiple different chipping codes. The input data is spread/modulated on one frequency or one set or several sets of frequencies such as orthogonal frequencies, and then data on individual carriers are spread in time by different PN codes. The FM SS frequencies are combined before transmission to the antenna(s).

The present invention contemplates an MC FM SS Communication System with code modification as another modulation technique that is used for building a FM Spread-Spectrum System. The code is changed in such a way that the information is embedded in it, before modulation on the RF carrier.

In still another aspect of the present invention, the MC FM SS Communication System uses 2-dimensional spreading of data in both the frequency and time domains before wireless transmission.

In still another aspect of the present invention, the MC FM SS Communication System connects to multiple input-multiple output (MIMO) antennas in both the MT and Base Station.

In still another aspect of the present invention, at least one MC FM SS Communication System is provided that uses guard band subcarriers of an OFDM high data rate modem for data transmission.

In another aspect of the invention, a phone system is provided with an FM SS communication unit that operates while the OFDM System is in sleep mode. Therefore it carries out duplex communication with the base station when the higher data rate OFDM channel is not required.

In the FM SS communication System in accordance with the present invention, the data transmission can be performed with the guard ring carriers and/or pilot subcarriers of a parallel OFDM system carried on the main RF carrier. The operation of the FM SS System is concurrent or sequential with the operation of the OFDM system.

In the FM SS communication System in accordance with the present invention, the data symbol can be transmitted over n subcarriers, with each subcarrier encoded in frequency or phase, which operate in parallel with an OFDM System, in order to bring it out of sleep mode and provide power efficient duplex communication at lower data rates, when the high data rate OFDM System is not required to operate.

In another aspect of the invention, an MC FM SS and Variable Spreading Factor (VSF) OFDM transceivers are provided, which can operate concurrently using different subcarrier frequencies within the assigned OFDM channel bandwidth.

In still another aspect of the invention, a wide band OFDM Mobile System with FM SS transceivers capable of meeting the 4G and LTE requirements is provided. The FMSS System performs control and channel estimation for the OFDM Modem. It operates in parallel with VSF OFDM Downlink and MC DS CDMA Up Link for a complete wide band 4G system.

In still another aspect of the invention, a wide band GSM-FM Phone is provided that operates using existing GSM protocol and W-CDMA technology and additionally using FM/FSK/GMSK or OFDM Modulation where the FM SS System performs the channel estimation, synchronization and control function for the high data rate OFDM Modem.

In still another aspect of the invention, a 4G System wireless communication system is provided, with separate MC FM SS duplex modem to perform channel estimation, adaptive power allocation, OFDM pilot synchronization, power control among different users, OFDM pilot synchronization (Symbol Synchronization), frequency acquisition for OFDM modems, registration/authentication, calculate the relative timing between transmitter and receiver as well as other functions using the estimated 25% of OFDM subcarriers assigned for guard ring and/or pilot subcarriers (e.g. the first and last 125 carriers).

In still another aspect of the invention, a 4G System Wireless Communication System is provided, with separate MC FM SS duplex modem that reduces power dissipation in the mobile terminal and increases the battery life time by using the low power dissipation FM SS System most of the time and the OFDM system when needed.

In still another aspect of the invention, an FM SS communication platform is provided, which is designed as a configurable Intellectual Property (IP in VHDL or Verilog Code) (i.e. programmable with selectable sub carriers, carriers and adjustable modulation parameters, and variable process gain from different PN sequences). The transceiver IP block contains a programmable time and frequency code generators and f and t spreader for the input modulated data stream. This IP is licensed and integrated in an "Application Specific Integrated Circuits (ASIC)" for wireless applications.

In still another aspect of the invention an MC FM SS with DDS Synthesizer and mixers is provided, that produce sum and difference tones and band pass filter to select single side band, i.e., NBFM Single Side Band.

In still another aspect of the invention, an MC FM SS System under the control of phone base band processor is provided, where a tuning word will select the output FM frequency.

In still another aspect of the invention, an MC FM SS System under the control of phone base band processor (controller) is provided, which is implemented using high speed logic in ASIC or FPGA imported into the ASIC from a high level VHDL/Verilog design and a physical layout GSII implementation.

In still another aspect of the invention, an MC FM SS System is provided, where the modulation index of the FM output is controlled by digital circuits and controller software.

In still another aspect of the invention, an MC FM SS System is provided, where the output signal tracks the frequency of a local reference signal. the FM frequency is synchronized with base station oscillator.

In still another aspect of the invention, an MC FM SS System is provided, that optimizes dispreading correlator function by maximizing the received amplitude of an embedded Pilot Signal after dispreading. The synchronization scheme searches for the spreading code phase value that maximizes the dispread pilot tone amplitude.

In still another aspect of the invention, an MC FM SS System is provided, that connects to multiple local FM users.

In still another aspect of the invention, an MC FM SS System is incorporated in mobile terminals for Direct Audio Communication, Conferencing, Personal Computer, PC, Interface and FM Automation of House or Office Appliance, RC Toys/Game Control, Garage Door Opener, Wireless Access Control, Phone Security, RFID Scanner. In one implementation these functions are provided by a separate FM output to a separate internal or external antenna for direct communication.

Other objects, features and advantages of the present invention will be apparent to those skilled in the art upon a reading of this specification including the accompanying drawings.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
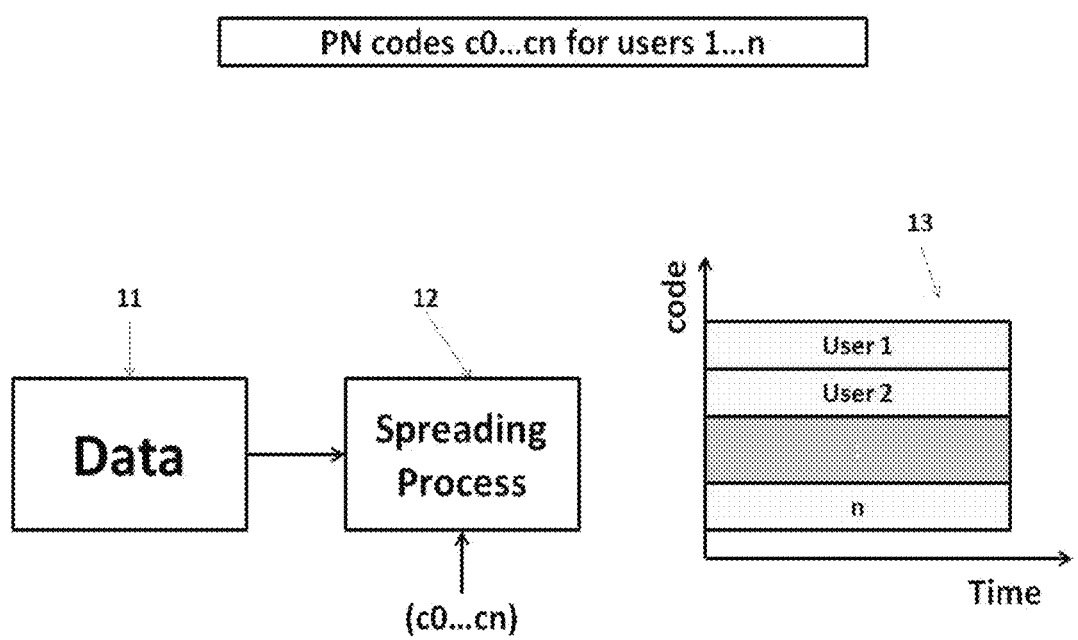
FIG. 1: Direct Sequence Spread Spectrum.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 10:
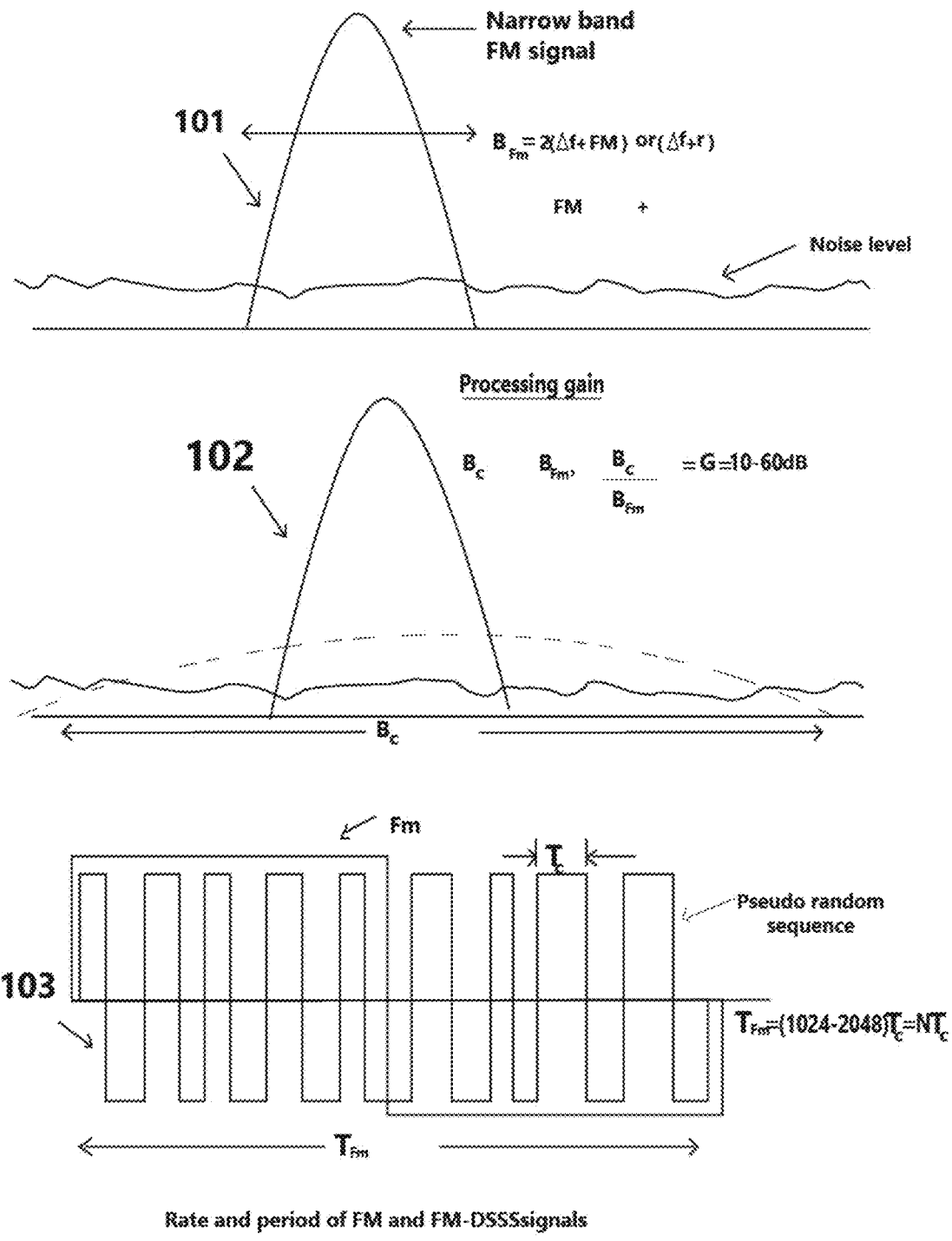
FIG. 10: Rate and period of FM and FM DSSS signals.

The combination of FM modulation and DSSS present a useful design alternative for cellular communication systems. FIG. 10 illustrates a combination of FM and DSSS modulation. The frequency spectrum of FM modulated signal is a narrow band with bandwidth of $2(\Delta f+fm)$ for fm modulating frequency and $\Delta f$ is the maximum frequency shift of the instantaneous carrier frequency. Alternatively the FM spectrum bandwidth is $(\Delta f+r)$, where r is the bit rate and $\Delta f$ or df is the frequency deviation or shift between the one and zero frequencies (FSK). Applying the pseudo random sequence to the FM spectrum results in a wider spectrum with bandwidth Bc which is equal to the FM bandwidth Bfm times the processing gain (G). The processing gain is the ratio of the chip code rate and the data rate or $T_{FM}/T_C$.

At the transmitter:

$$FM\text{-}DSSS(t)=fm(t)*\text{chip}(t)$$

FM (t)=frequency modulation waveform
Chip (t)=PN waveform
FMDSSS (t)=baseband waveform At the receiver:

$$\text{Output}=\overline{\text{chip}(t)}[fm\text{-}dss(t)]+\overline{\text{chip}(t)}*\text{noise}(t)=\\ \overline{\text{chip}(t)}[fm(t)*\text{chip}(t)]+\overline{\text{chip}(t)}*\text{noise}(t)=fm(t)+\\ \overline{\text{noise}(t)}$$

$$Fm(t)=AJ1(\beta)\cos(2\pi(Fc+Fm)t)$$

Figure 11:
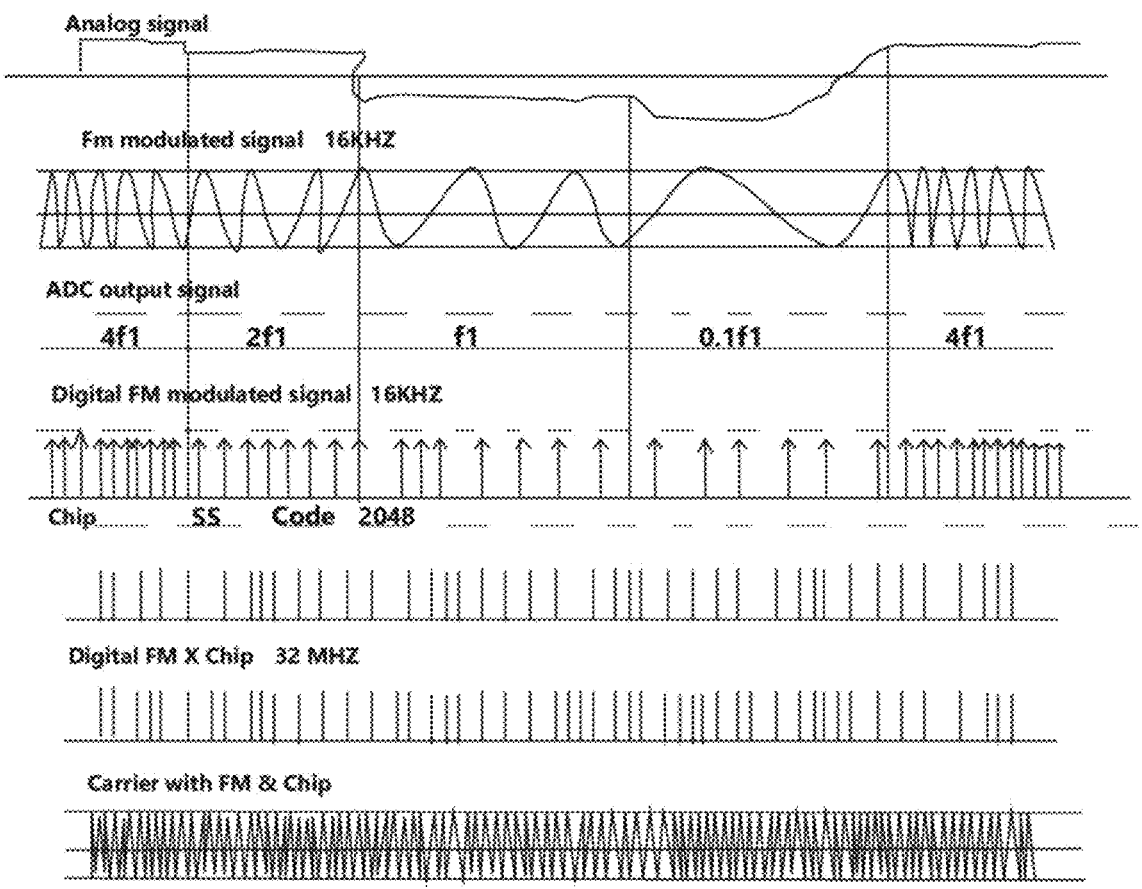
FIG. 11: FM DSSS modulation waveforms.

The higher the processing gain, the wider and lower the power spectral distribution of the FM-DSSS signal, i.e., closer to a noise signal. The FM signal is recovered at the receiver by the de-spreading process discussed earlier. The FM DSSS modulation wave forms are illustrated in FIG. 11. Here an analog signal is FM modulated, and digitized at 16 Khz. Then a SS chip code 2048 pulses per second in length is applied to the data resulting in 32 MHz signal which is applied to the RF carrier.

MC FM SS architecture provides design simplicity, high data rate for the down link of cellular wireless system. The high data rate can be achieved by the use of multi carrier system such as OFDM. OFDM is capable of achieving high bit-rate transmission. Multi carrier FM SS combines FM and DSSS technique in parallel with OFDM. Multi carrier FM SS combines DSSS technique with a subset of the OFDM subcarriers. Therefore it carries out duplex communication with the MT when the higher data rate OFDM channel is not required. Also MC FM SS is a robust architecture for multipath fading environment.

Code Division Multiple Access (CDMA) and/or Orthogonal Frequency Division Multiple Access (OFDMA) are adopted in current 4G system proposals. In OFDM the input data stream is divided among N parallel smaller data substreams that form narrow bandwidth channels. This is achieved using a Serial to parallel converter. These parallel sub-streams are multiplied with orthogonal carriers and summed up to achieve spectrum which efficient in bandwidth. Guard band period is added to this OFDM spectrum to achieve orthogonality among each carrier and to eliminate Intersymbol Interference (ISI). Usually guard period is kept greater than delay spread of the channel. The simple multicarrier modulation is implemented using IFFT and FFT transforms. IFFT is used at the transmitter and FFT is used at the receiver.

The multiple access technique is achieved with OFDM by sub-carrier distribution to users. Total numbers of subcarriers are divided among different subscribers. These sets of subcarriers allocated to different subscribers are designated as sub channels. Hence each subscriber will have a different sub channel for data/voice to be transmitted.

Figure 12:
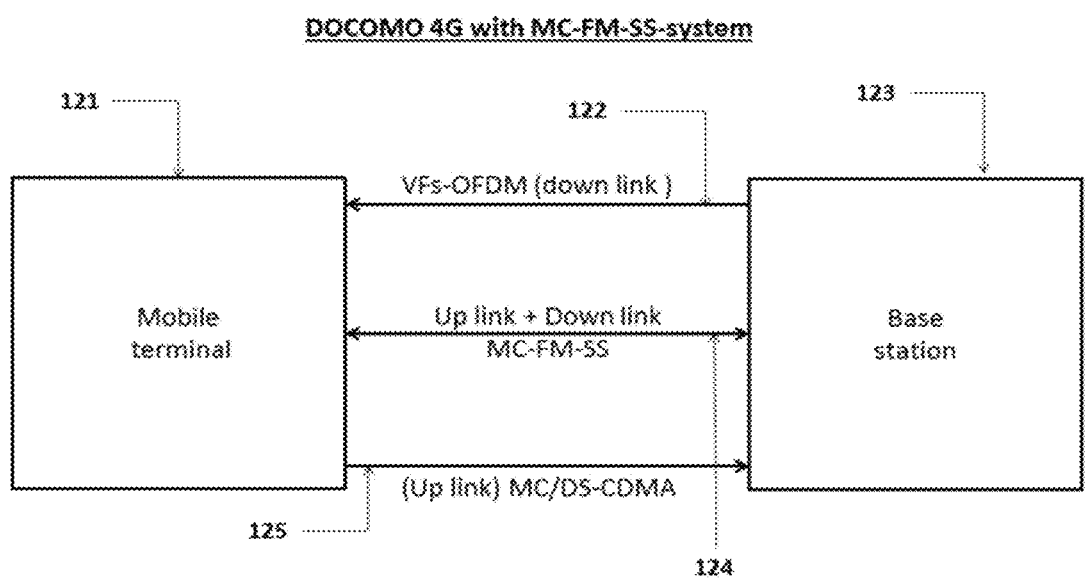
FIG. 12: DOCOMO 4G with MC FM SS System.

FIG. 12 shows base station-mobile terminal up and down links of MC-FM-SS architecture in parallel with the proposed VSF-OFDM and the MC/DS-CDMA systems. These are the modulation techniques used in down link and uplinks of the system. 4G and LTE mobile system objectives target much higher data rates almost dictating the multiple carrier OFDM approach. The data rate asymmetry in 4G favors two different modulation approaches for the down link and the uplink. The carrier separation is 9-16 KHz. The down link bandwidth is 20-100 MHz and the uplink bandwidth is 40 MHz. The data carrying capacity depends on the number of carriers, carrier separation and the specific implementation of the frequency/phase modulation scheme and can vary from 15-550 Mbps.

An additional duplex communication system is proposed (MC FM SS) to operate in parallel with the above mentioned configuration. The MC FM SS and OFDM systems utilize frequency division so that both channels use different frequency bands within the maximum available bandwidth and run continuously and independently in time.

The 4G system is designed with a separate novel MC FM SS duplex modem to perform channel estimation, adaptive power allocation, power control among different users, OFDM pilot synchronization (symbol synchronization), frequency acquisition for OFDM modems, registration/authentication, direct audio communication, conferencing, Personal computer, PC, interface and FM automation of house or office appliance, RC toys/game control, garage door opener, wireless access control, phone security, RFID scanner, paging, information broadcast etc. using some of the estimated 25% of OFDM subcarriers assigned for guard ring and/or pilot subcarriers (e.g. the first and last 125 carriers). The remaining sub-carriers are the OFDM data subcarriers and are for down link data symbol transmission. This addition of MC FM SS to the 4G communication system results in reduced power consumption in the handset.

In one implementation these functions are provided by a separate FM output to a separate internal or external antenna for direct communication. The low modulation index FM processor (NBFM modulator) can be implemented by direct digital frequency synthesis (DDS) architecture and acts as a co-processor to the Base Band Digital Signal Processor (BB DSP). The processor provides very fast frequency change with fine steps, excellent phase noise, transient-free (phase continuous) wave forms, flexibility, and small size.

The OFDM modem transmits high data rates and therefore consumes a lot of battery power; therefore it should be turned on only when needed. The MC FM SS is a narrower bandwidth modem that provides service in all other lower data rate and mobile control requirements. The FM modem is power efficient.

Figure 13A:
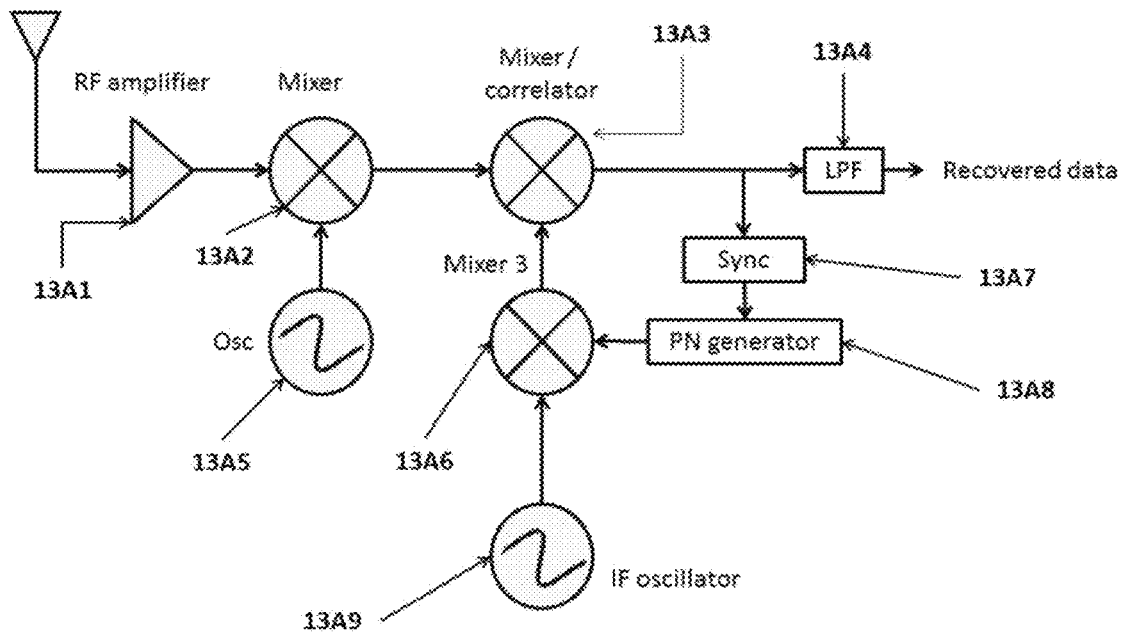
FIG. 13A: DS-CDMA Receiver.
Figure 13B:
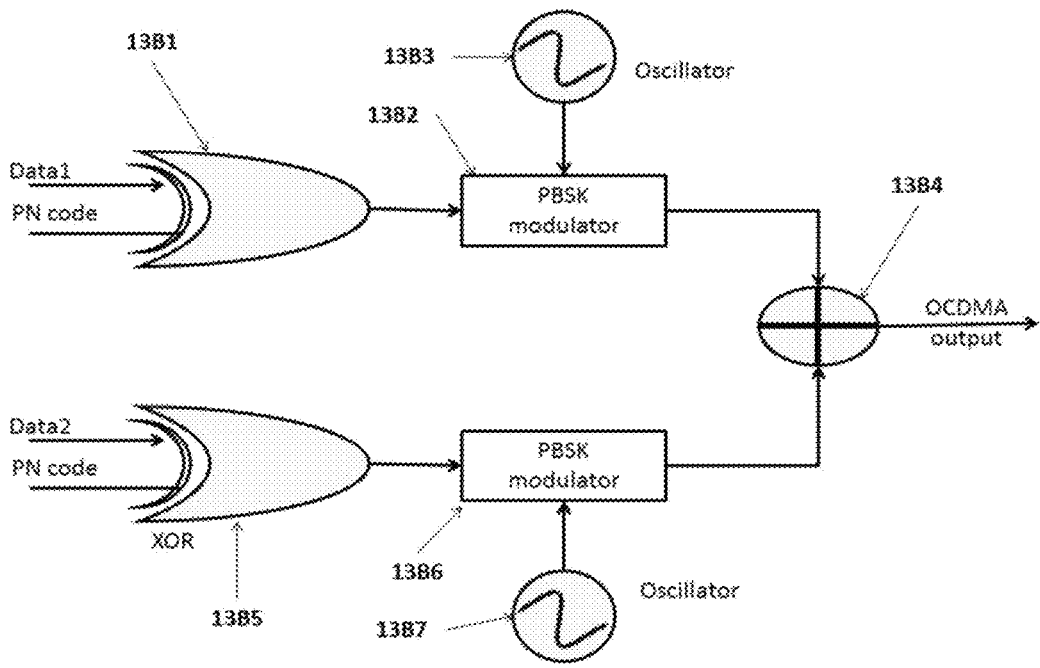
FIG. 13B: MC DS-CDMA modulator, up link, with two data subcarriers.

FIG. 13a shows the main components of a DS CDMA receiver. The decoding of the PN code is generally done in an IF mixer, also called a correlator, rather than in the baseband. FIG. 13b illustrates the realization of MC DS CDMA modulator with two data subcarrier(s). Oscillators 1 and 2 are synchronized. In this realization the resulting scrambled bit streams are fed to BPSK or QPSK modulators. The output signals are combined and mixed with the RF carrier.

FIG. 14: shows a simplified and general block diagram of the FM SS system, both transmit and receive sides. The input data is spread/modulated on one frequency or one set or several sets of frequencies such as orthogonal frequencies, and then data on individual carriers are spread in time by different PN codes. The FM SS frequencies are combined before transmission to the antenna(s). Frequency selection, spreading/modulating is performed by a LUT, non-coherent FSK, CPFSK, or IFFT that converts the digital data to a pattern of modulated subcarrier frequency data e.g. $f_1 \ldots f_N$. The subcarriers are modulated in phase, frequency or by on-off keying before spreading in time. In case of FM modulation only the upper side band is transmitted to represent binary 1. In the case of binary 0 the subcarrier is suppressed or replaced by 0 in the IFFT transform. The FM modulation of the frequency spreading code allows the suppression of one subcarrier if it is modulated by binary state 0. The MC FM SS system uses multiple input multiple output MIMO antenna to enhance throughput and performance by spatial multiplexing and diversity coding. Code modification is another modulation technique that can be used when building a FM spread-spectrum system. Under this approach, the code is changed in such a way that the information is embedded in it, before modulation on the RF carrier.

Figure 15:
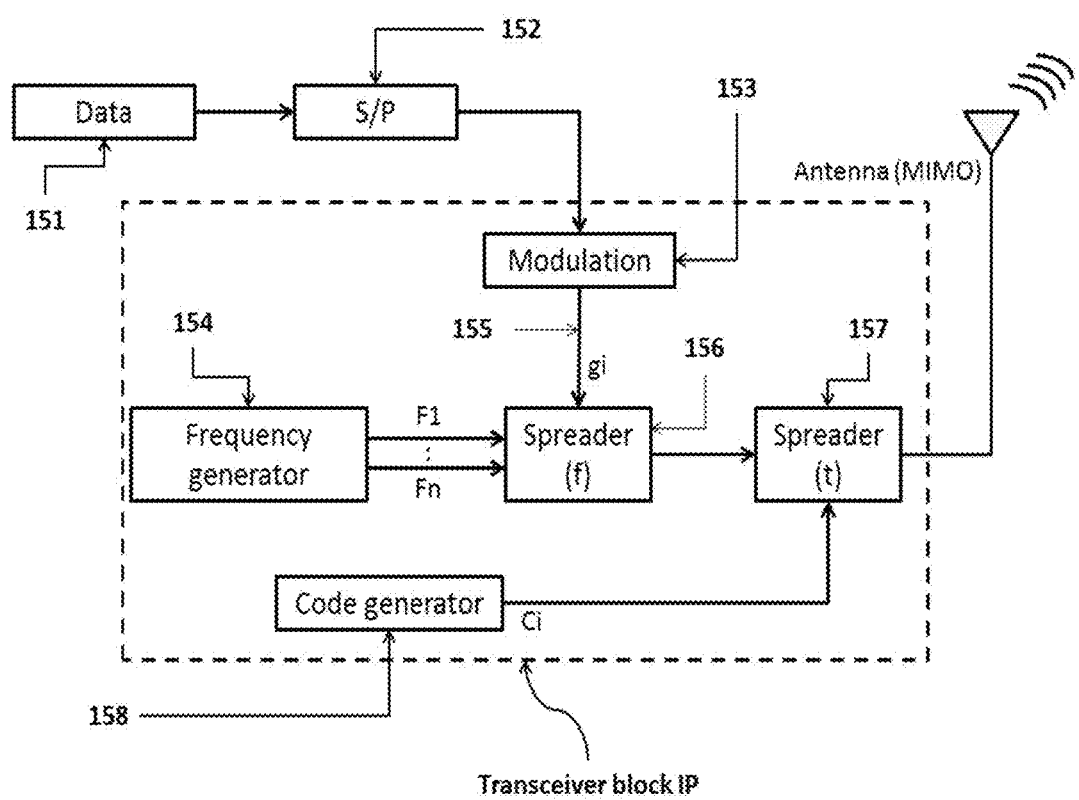
FIG. 15: Simplified block diagram for frequency and time spreading (DOWN LINK).

FIG. 15 shows a 2-dimensional spreading of data in both the frequency and time domains, and a block diagram of the scheme that uses 2-D spreading for down link.

As an example of how the 2D spreading works, the first data symbol, $d_0$ uses a spreading factor in the time domain, $SF_{time}$, of length 4, and a spreading factor in the frequency domain, $SF_{frequency}$ of 2, then the data symbol, $d_0$, will be multiplied by the length-2 frequency-domain PN codes and placed on subcarriers 0 and 1, and these values on subcarriers 0 and 1 will then be multiplied by the length-4 time-domain PN code and transmitted on OFDM symbols 0, 1, 2 and 3.

Figure 16:
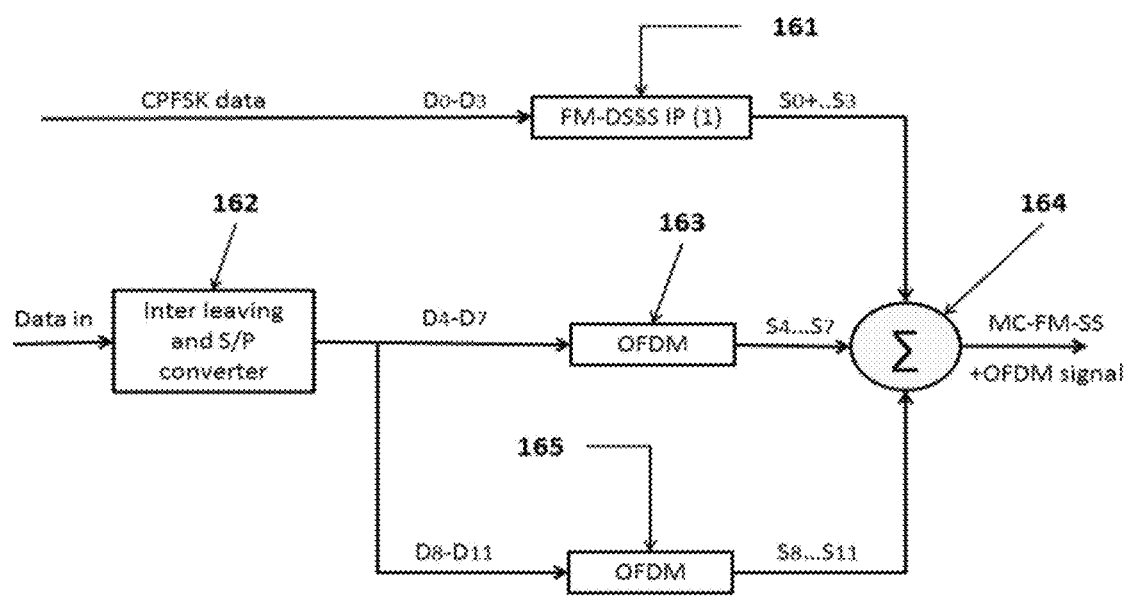
FIG. 16: MC FM SS base station implemented with FMDSSS IP blocks (Down Link).

In the base station example shown on FIG. 16 the data $d_m$ is modulated by either BPSK, QPSK or 16-QAM schemes. This modulated set of complex data is passed on to serial to parallel converter. The parallel data are multiplied by various PN codes C0 to Cn and these data sub-streams are assigned to orthogonal set of carriers g0 to gn to achieve OFDM spectrum which forms one symbol. The same is done for all the subscriber stations at the base station to form OFDM data. Multicarrier MC FM SS signal spectrum is a subset of OFDM subcarriers. For MC FM SS non coherent FSK or CPFSK modulation is used. In a subscriber transmitter model; zeros are inserted in the positions where data is not available at the input of OFDM-IFFT block and in place of binary 0 in the case of on-off switching modulation. The Frequency modulated (FM)-spread spectrum (SS) communication platform, FIG. 16, is designed as a configurable intellectual property (IP in VHDL or Verilog code) (i.e. programmable with selectable sub carriers, carriers and adjustable modulation parameters, and variable process gain from different PN sequences). This IP is licensed and integrated in an "Application Specific Integrated Circuits (ASIC)" for wireless applications.

There are several advantages to the use of MC FM SS transceiver for radio communications system stand alone or in parallel with high data rate OFDM modem to facilitate its operation. The advantages are FSK hardware simplicity which yields low power requirements, and hence improved communication and control. Also amplitude noise immunity and the application of a power efficient non-linear amplifier without distorting the signal. This power issue is of particular importance when using small portable transmitters, such as those required by cellular technology. High data rate OFDM modems and linear amplifiers are power hungry. This means that the power consumption is high and hours of battery operation is low. Utilizing MC FM SS in parallel with OFDM is an effective solution to the power problem.

The smart phone and the base station agree to communicate in duplex form (FDD) at selected sub carrier frequencies. The FM SS modem provides the coordination, control, and monitoring for the communication as well as other functions.

FSK and OOK modulation of subcarriers is implemented based on the binary state of the data e.g. with 0 (the subcarrier is suppressed-on-off keying) or encoded with frequency f1 or f2. Alternatively an M-ary FSK modulator may use several pairs of frequencies to represent digital data efficiently, i.e., more bits per frequency, (higher order FM is encoded e.g. a single frequency may represent 2-4 bits). In one implementation the FM transceiver uses differential FSK. The frequency coding is applied to the difference between the input data and the 01010101 sequence or its complement.

The main characteristics and benefits of the MC FM-SS system are:

MC FM SS signal is modulated on N subcarriers using FSK or CPFSK. These N subcarriers may be a subset of OFDM orthogonal frequencies.

The combined OFDM and MC FM SS architecture addresses the issue of how to increase data rate, and signal bandwidth without increasing the adverse effect of power consumption and delay spread.

MC FM SS transceiver deployed in parallel with OFDM 4G DL is used in determination of relative timing between transmitter and receiver, perform channel estimation, adaptive power allocation, OFDM pilot synchronization and other functions.

MC FM SS utilizes several narrow band (orthogonal sub-carriers) communication channels which are relatively immune to intersymbol interference (ISI). However, narrowband FM communication circuits are susceptible to flat fading. To avoid deep fades over entire signal bandwidth spread spectrum circuits are added to the communication platform. DSSS system provides high capacity, resistance to multipath fading.

It is unlikely that all subcarriers of FM SS platform will be located in deep fade and therefore frequency diversity is achieved. This is particularly true if the subsets of OFDM subcarriers used are spaced apart across the entire OFDM bandwidth.

FM system provides reliable speech quality and simplicity for simple voice or audio applications in parallel with the wireless communication.

FM SS modem offers resistance to intended or unintended jamming

FM SS modem offers sharing of a single channel among multiple users and simplified frequency planning.

Reduced signal/background-noise level hampers interception.

The MC FM SS platform in accordance with the present invention operates by spreading the FM/FSK modulated data across several subcarriers and by PN sequence. Channelization codes are orthogonal codes that are applied to the data based on Orthogonal Variable Spreading Factor (OVSF) technique.

This technique can also direct the transmission to multiple users from a single source (e.g. in downlink). If limited orthogonal codes must be re-used in every cell, then a need for additional long (scrambling) codes exists to avoid inter-cell interference. MC FM SS platform allows users to share time and frequency. Therefore eliminating the need for tight synchronization among many different users and eliminating the need for expensive analog filters.

Figure 14A:
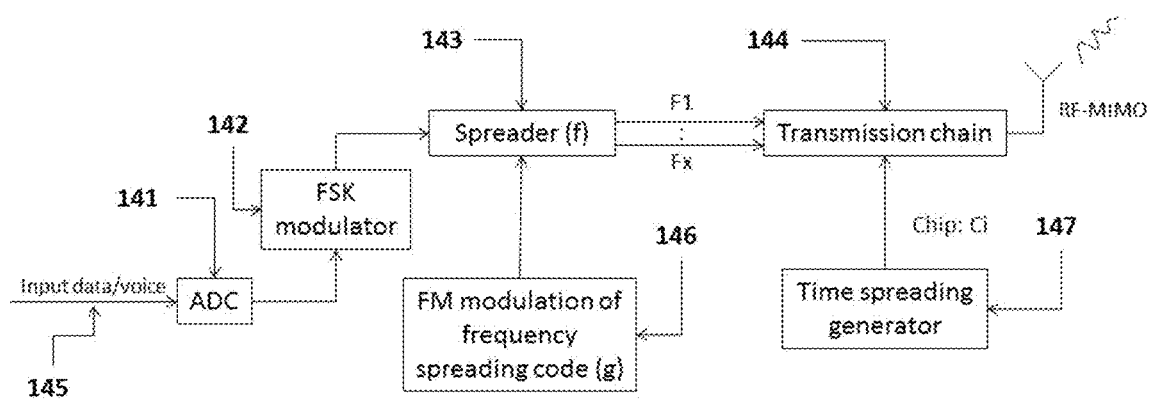
FIG. 14 Block diagram of MC FM-DSSS System (Down Link) and MC-DS-CDMA (UP LINK).
Figure 14B:
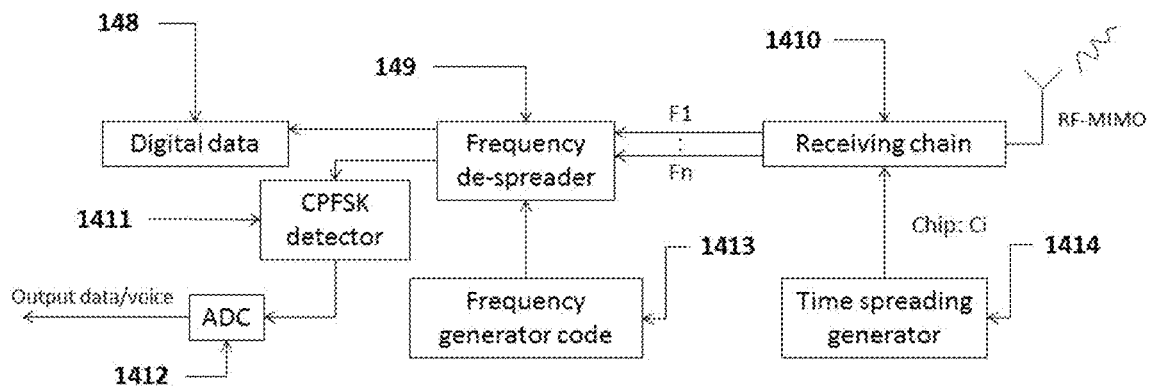

FIGS. 14a and 14b show a simplified block diagram of an FM SS system, both transmit and receive sides. The input data is spread/modulated on one frequency or a set of orthogonal frequencies, and then data on individual carriers are spread in time by different PN codes. The FM SS frequencies are combined before transmission to the antenna(s). Frequency spreading/modulation is performed by converting the digital data to a pattern of FSK modulated subcarrier frequency data e.g. f1 ... fN. A DSP with memory LUT (DDS) with phase, quadrature components calculator performs M-ary FSK modulation or IFFT is used before RF modulation. The binary 1 and 0 states are represented by frequency (f1 and f2) or by on-off keying before spreading in time. In case of on off keying, OOK, the subcarrier is transmitted to represent binary 1. While in the case of binary 0 the subcarrier is suppressed.

Coherent detection/demodulation is performed at MPSK receivers incorporating a PLL, by estimating the carrier phase shift between the transmitter and receiver. Then the in phase and quadrature components are formed and fed to the decision device. The requirement of estimating the carrier phase for the M signals makes coherent demodulation of MFSK signals very complex. For FSK, a non-coherent demodulator is preferred, which does not require the estimation of the carrier phase. FSK is usually implemented as orthogonal signaling where each tone (sinusoid) in the signal set cannot interfere with any of the other tones.

For coherent detection the orthogonality condition leads to a condition on tone spacing given by:

$$2\pi(f1-f2)T=k\pi$$

or $$f1-f2=k/2T$$

Therefore, for coherently detected FSK the spacing between frequencies is k/2T, with a minimum spacing of ½T.

For non-coherently detected FSK the orthogonality condition leads to a condition on the frequency spacing given by:

$$(f1-f2)T=2k\pi$$

For non-coherent FSK the frequency spacing is therefore k/T with a minimum spacing of 1/T.

For the same symbol rate, coherently detected FSK occupies less bandwidth than non-coherently detected FSK.

For non-coherent detection phase measurement cannot be exploited. The coherent receiver is modified as follows:

For a frequency f1, two correlators are implemented, one to correlate with an in-phase reference signal:

$$\Phi 1I=\sqrt{2/T}*\cos(2\pi f1t)$$

and the other to correlate with a quadrature (90π out of phase) reference signal:

$$\Phi 1Q=\sqrt{2/T}*\cos(2\pi f1t)$$

For this reason a non-coherent detector therefore requires twice as many channel branches as a coherent detector.

Figure 17:
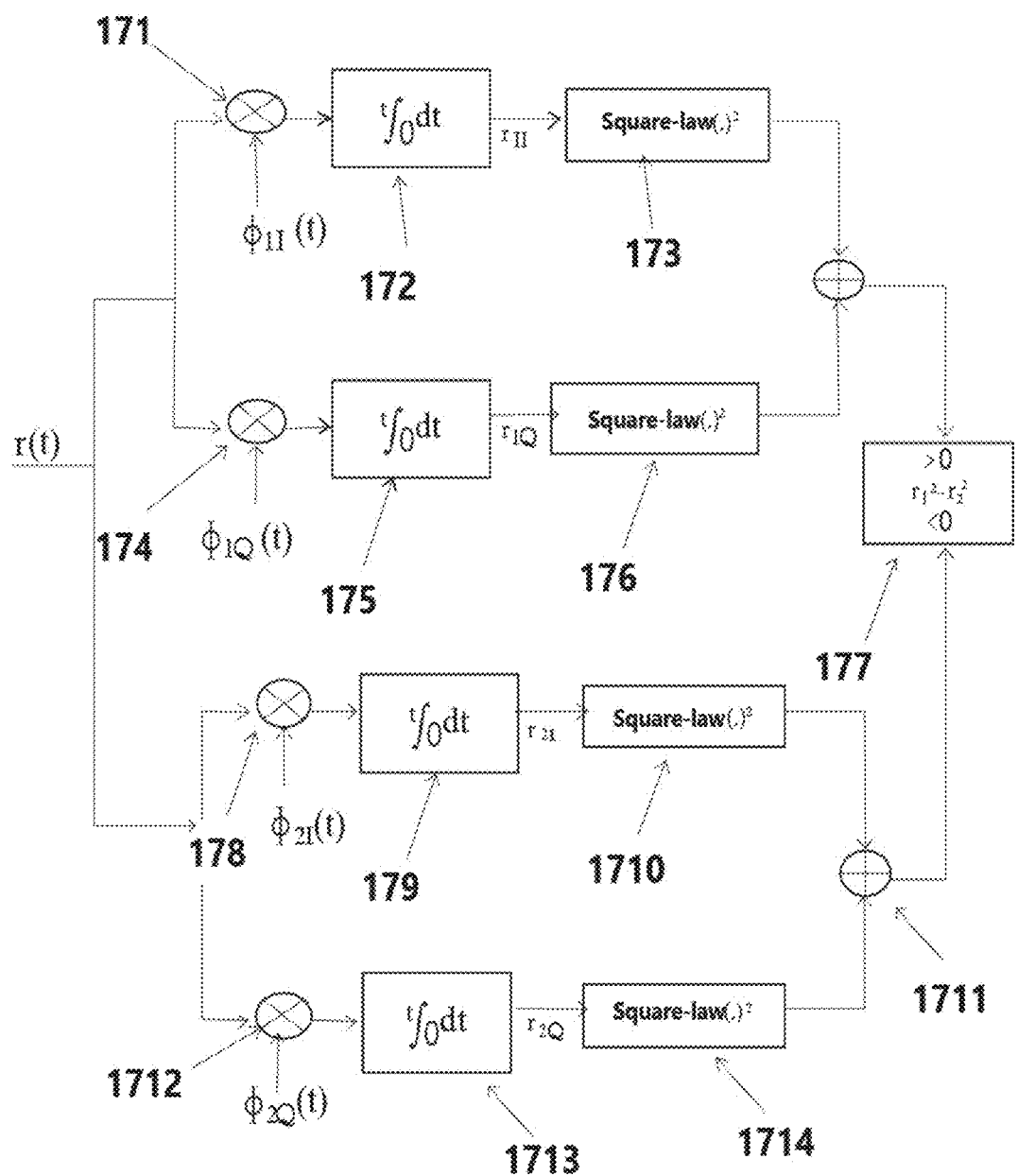
FIG. 17: Non coherent binary FSK demodulator and square law detector.

FIG. 17 illustrates a non-coherent receiver for the detection of binary FSK (BFSK):

The upper two branches are configured to detect f1, and the lower two branches are configured to detect f2.

If the received signal is of the form cos(2πf1)+n(t), where the phase is 0 and the frequency is f1, the top branch of the receiver would yield the maximum output. The second branch would yield a near 0 output since the reference signal √2/T*sin((2πf1t)) is orthogonal to the signal component. The third and fourth branches would also yield near zero outputs since their f2 reference signals are also orthogonal to the signal component.

If the received signal is of the form cos(2πf1t+φ), the received signal will partially correlate with the cos(2πf1t) reference signal and partially correlate with the sin(2πf1t) reference signal. The third and fourth reference signals will still return a near zero value due to orthogonality.

The receiver is therefore able to decide whether the received signal was an f1 signal or an f2 signal by squaring and summing the outputs from the upper two branches and comparing them with the sum of the squares of the outputs from the lower two branches.

r1 is given by:

$$(r_1)^2=(r_{1I})^2+(r_{1Q})^2$$

r2 is given by:

$$(r_2)^2=(r_{2I})^2+(r_{2Q})^2$$

The decision criterion is given by:

$$(r_1)^2>(r_2)^2, (r_1)^2-(r_2)^2>0 \qquad \text{set S1}$$

$$(r_2)^2>(r_1)^2, (r_2)^2-(r_1)^2>0 \qquad \text{set S2}$$

A receiver based on this decision criterion is known as a quadrature receiver.

Besides the common binary FSK, FSK includes multi-level modulation such as quaternary FSK. In addition, of the types of FSK, MSK (Minimum Shift Keying) which has a modulation index of 0.5 is particularly resistant to noise and can be used for long distance communication. MSK is a particular spectrally efficient form of coherent FSK. MSK is a constant envelope modulation' scheme and therefore is quite insensitive to non-linearities of power amplifier. It is also robust to fading effects. However it is characterized by moderate spectral efficiency when compared to QPSK, OQPSK, 16-QAM modulation schemes.

In MSK, the difference between the higher ($f_1$) and lower ($f_2$) frequency is identical to half the bit rate. Consequently, the waveforms that represent a 0 and a 1 bit differ by exactly half a carrier period.

Minimum Shift Keying (MSK) is a special type of continuous phase frequency shift keying (CPFSK). The peak frequency deviation is equal to ¼ the bit rate (is δ=0.25 $f_m$, where $f_m$ is the maximum modulating frequency). As a result, the modulation index m is 0.25. This is the smallest FSK modulation index that can be chosen such that the waveforms for 0 and 1 are orthogonal.

MSK has a modulation index of 0.5.

$M_{MSK}$=2 ΔF/$R_b$.

The name Minimum Shift Keying (MSK) implies the minimum frequency separation that allows orthogonal detection as two FSK signals VH(t) & VL(t).

$$\int_0^T VH(t)VL(t)dt = 0$$

MSK is a spectrally efficient modulation scheme and is particularly attractive for use in mobile communication systems because it has a constant envelope, being spectrally efficient with good bit error rate, BER performance and has self-synchronizing capability. For MSK demodulation with a modulation index of 0.5, synchronous detection is possible making it advantageous from the point of view of error rate. The MSK spectrum is not very wide and is concentrated around the carrier frequency. For this reason the frequency band of the circuit filter can be narrow, with good signal to noise.

Even though the derivation of MSK was produced by analyzing the changes in phase, MSK is actually a form of frequency-shift-keying (FSK) with (where $f_1$ and $f_2$ are the frequencies used for the pulses). MSK produces an FSK with the minimum difference between the frequencies of the two FSK signals such that the signals do not interfere with each other. MSK produces a power spectrum density that falls off much faster compared to the spectrum of QPSK. While QPSK falls off at the inverse square of the frequency, MSK falls off at the inverse fourth power of the frequency. Thus MSK can operate in a smaller bandwidth compared to QPSK, i.e., MSK in this regard is better than QPSK.

Where $F_c$=½*($f_1$+$f_2$), h=$T_b$($f_1$-$f_2$),

MSK is also viewed as using changes in phase to represent 0's and 1's, but unlike most other keying, the pulse sent to represent a 0 or a 1, not only depends on what information is being sent, but what was previously sent. The pulse used in MSK can also be expressed as follows:

S(t)=X cos(2 π$f_c$t+θ(t))

where:

X=$\sqrt{2E_b/T_b}$

θ(t)=θ(0)+πh/$T_b$    For logical state 1

θ(t))=θ(0)-πh/$T_b$    For logical state 0

With h=Modulation index=0.5, h=½, the phase values are {-π/2, 0, π/2, π} at integer intervals of Tb. The phase of MSK does not go to infinity, but rotates around 0 phase, even when a large number of the same symbol is transmitted sequentially.

When looking at a plot of a signal using MSK modulation, it can be seen that the modulating data signal changes the frequency of the signal and there are no phase discontinuities. This arises as a result of the unique factor of MSK that the frequency difference between the logical one and logical zero states is always equal to half the data rate. This can be expressed in terms of the modulation index, and it is always equal to 0.5. MSK modulated streams are shown on FIG. 18 for single data stream and FIG. 19 for split data stream (odd and even), showing MSK modulation of digital data with modulation index m=0.5.

A plot of the spectrum of an MSK signal shows sidebands extending well beyond a bandwidth equal to the data rate (FIG. 20), hence interference between adjacent signals in the frequency band is not avoided. To solve this problem, the original binary signal is passed through a Gaussian shaped filter before it is modulated with the MSK carrier. The requirements for the filter are that it should have a sharp cut-off, narrow bandwidth and its impulse response should show no overshoot. The filter has a Gaussian shaped response to an impulse and no ringing. In this way the basic MSK signal is converted to GMSK modulation (Continuous phase digital frequency modulation).

Figure 20:
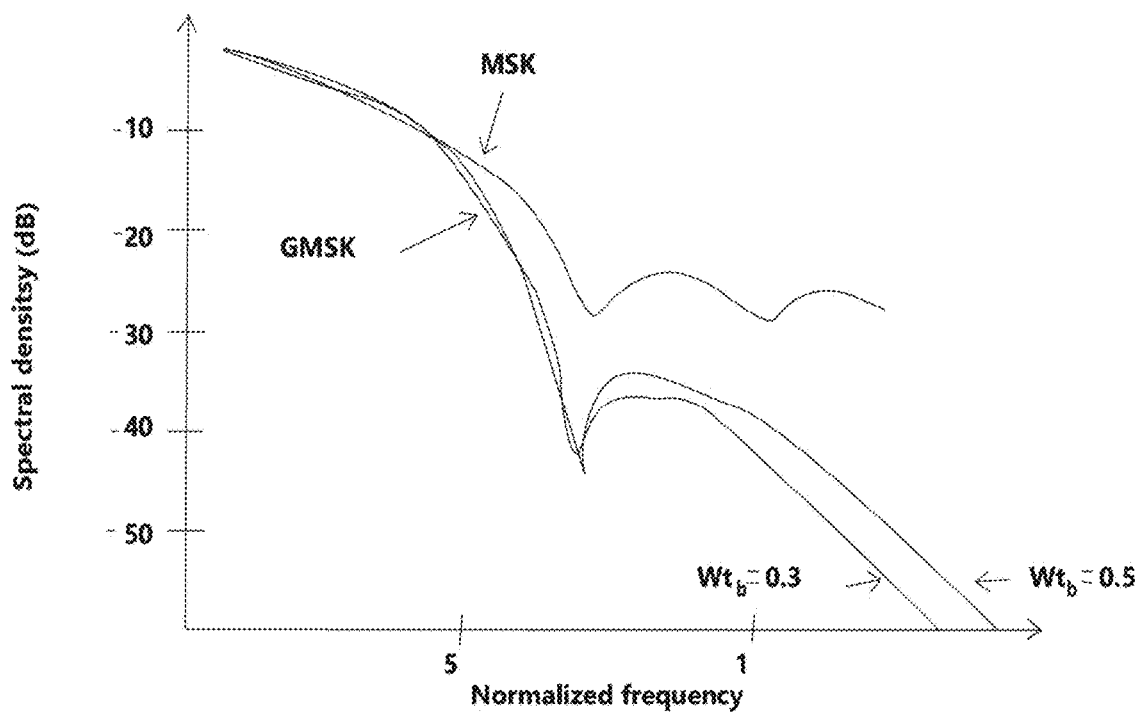
FIG. 20: Spectral density of MSK and GMSK Signals, Signal Amplitude Versus F/R.

FIG. 20 shows spectral density of MSK and GMSK signals, Signal amplitude versus fir.

The principle parameter in designing an appropriate Gaussian filter is the time bandwidth-Product, w$T_b$.

$T_b$=bit duration.

w=3 dB Bandwidth of the shaping filter.

As can be seen from FIG. 20, GMSKs power spectrum drops much quicker than MSK's. Furthermore, as the time-bandwidth product, w$T_b$ is decreased from 0.5 (GSM) to 0.3 (DECT), the roll-off is even quicker. The MSK has a time-bandwidth product of infinity. The smaller the w$T_b$ the smaller the spectral density however this comes at a tradeoff of increased inter-symbol interference. This is because by smoothing the edges of the bit pulses they begin to overlap each other. The greater the smoothing, the greater the overlapping, until eventually individual bits may be undetectable.

The GMSK transceiver input is connected via the above mentioned Gaussian low pass filter. The odd and even sub-streams of the data stream are integrated, filtered, and then added. A simple GMSK modulator using a voltage controlled oscillator, VCO, is shown on FIG. 21. Where x(t) is the Modulated Signal. The instantaneous frequency of the signal carries the information about the data $a_k$. The VCO changes the frequency proportionally to the voltage of the modulating signal so that the phase between bits is continuous. CPFSK (Continuous Phase FSK) is characterized by its low levels of unwanted emissions (spurious emissions) which cause various adverse effects. But types which control VCO with the base band have problems with modulation accuracy and don't perform synchronous detection, so the benefits of MSK are lost.

Figure 22:
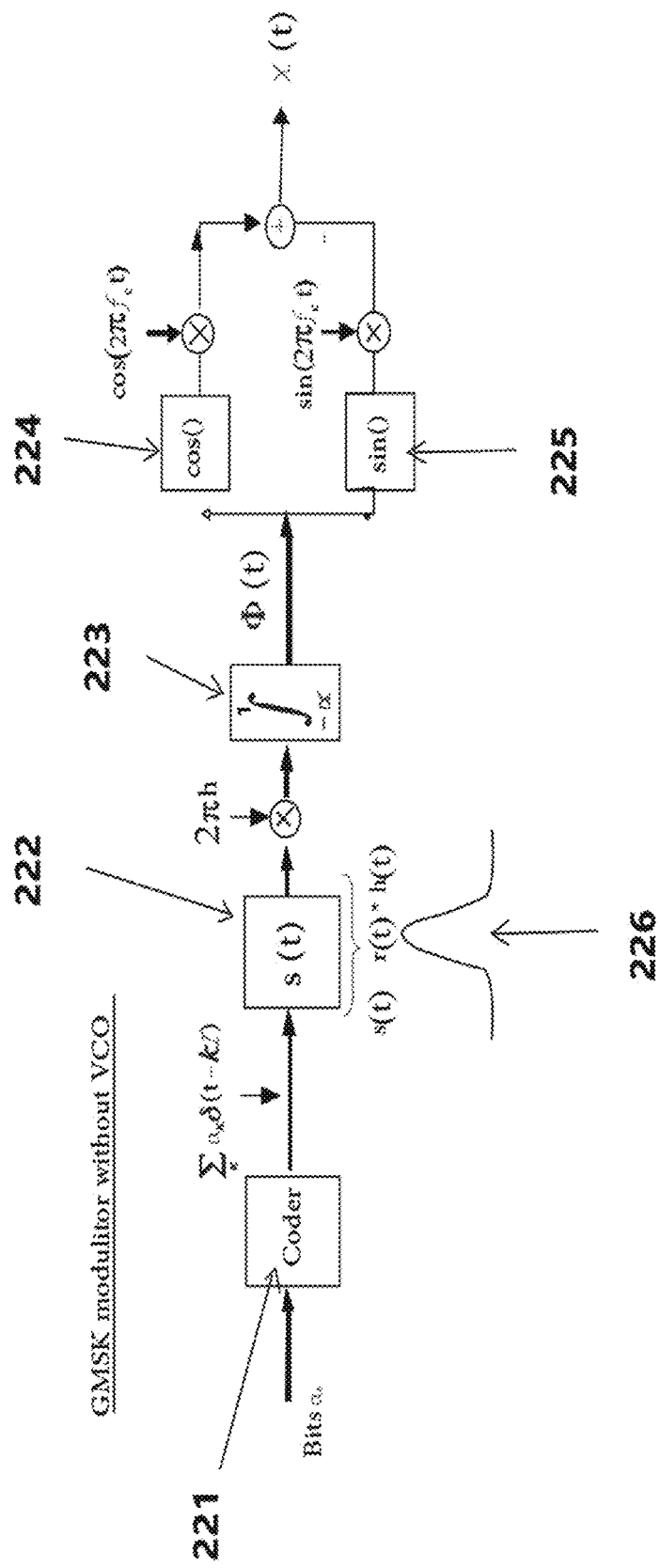
FIG. 22: GMSK Quadrature Modulator without VCO.

The quadrature (I-Q) modulator of FIG. 22 uses one signal that is said to be in-phase and another that is in quadrature to this (imaginary component). Cos(2 π $f_c$t) and sin(2π7$f_c$t) are called quadrature carriers because they have a phase difference equal to π/2. The two signals $Z_1$ and $Z_Q$ are called quadrature components because they modulate the two quadrature carriers. The I and Q components are generated by taking sine and cosine of the filter-integrator output. These signals generate the GMSK output once passed through the modulator. Using this type of modulator the modulation index can be maintained at exactly 0.5 without the need for any settings or adjustments. This makes it much easier to use, and capable of providing the required level of performance without the need for adjustments.

The CPFSK modulation of the MC FM SS system uses a Non coherent Binary FSK demodulator and a square-law detector and a GMSK quadrature modulator to convey data between the base station and the MT. In case of using a DSP modulated loop, the DSP generates the instantaneous frequency $f_{inst}$ signal that is sent to the DAC. $f_{inst}$ is obtained by a simple filtering of the bit sequence $a_k$ by a FIR filter of impulse response s(n).

$$f_{inst} = h \sum_{k=-\infty}^{+\infty} a_k s(\tau - kT).$$

Alternatively when Quadrature modulation is used, the DSP calculates the phase Φ and the 2 baseband components $z_I$ and $z_Q$ and sends them to the DAC. The baseband components $z_I$ and $z_Q$ are modulated in amplitude by the 2 quadrature carriers, i.e., $$x(t)=\cos(2\pi f_c t+\Phi(t))=\cos(\Phi(t))\cos(2\pi f_c t)-\sin(\Phi(t))\sin(2\pi f_c t)$$

$$x(t)=z_I(t)\cos(2\pi f_c t)-z_Q(t)\sin(2\pi f_c t)$$

The baseband components are:

$$z_I(t)=\cos(\Phi(t))$$

$$z_Q(t)=\sin(\Phi(t))$$

The carriers are:

$$Carrier_I=\cos(2\pi f_c t)$$

$$Carrier_Q=\sin(2\pi f_c t)$$

The DSP calculates the phase as a function of time and reads the cos and sin values from a memory look up table. Here the DSP sampling frequency may be set to 8 times the data/bit rate.

Figure 23A:
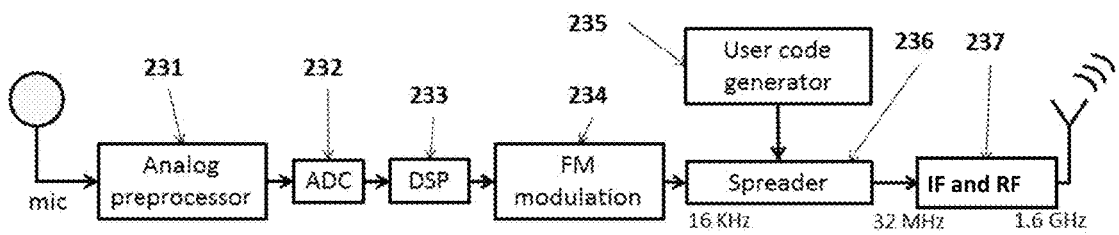
FIGS. 23A and 23B: Together show a simplified block diagram an OF FM DSSS System.
Figure 23B:
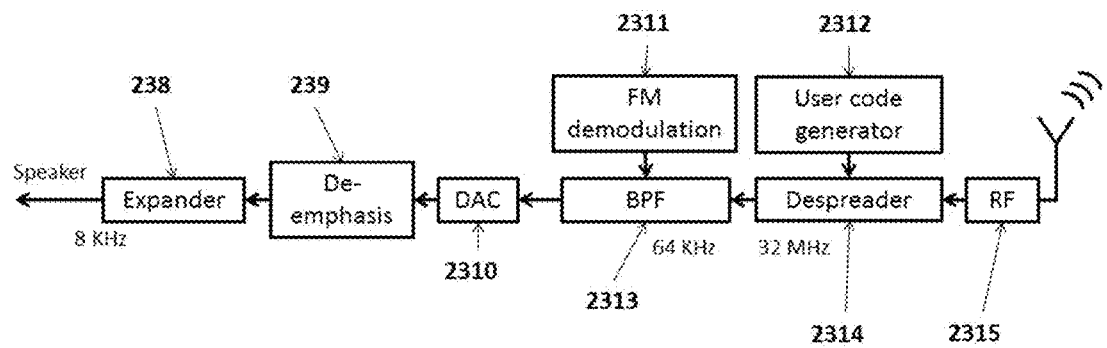

FIGS. 23A and 23B together show a simplified block diagram of a single carrier FM SS system. The system performs the function of a mobile terminal or acts as a transceiver in parallel with W-CDMA in a wideband smart phone (WBSP). In this example voice data is FM modulated in 16 KHz bandwidth, thereafter the data is time spread by PN code sequence to a 32 MHz bandwidth. This is followed by carrier mixing with IF (220 MHz) RF (1.9 GHz) frequencies. The FM mod/de-mod are preceded and followed by the emphasis and de-emphasis filtering circuits on the voice signal.

Figure 24:
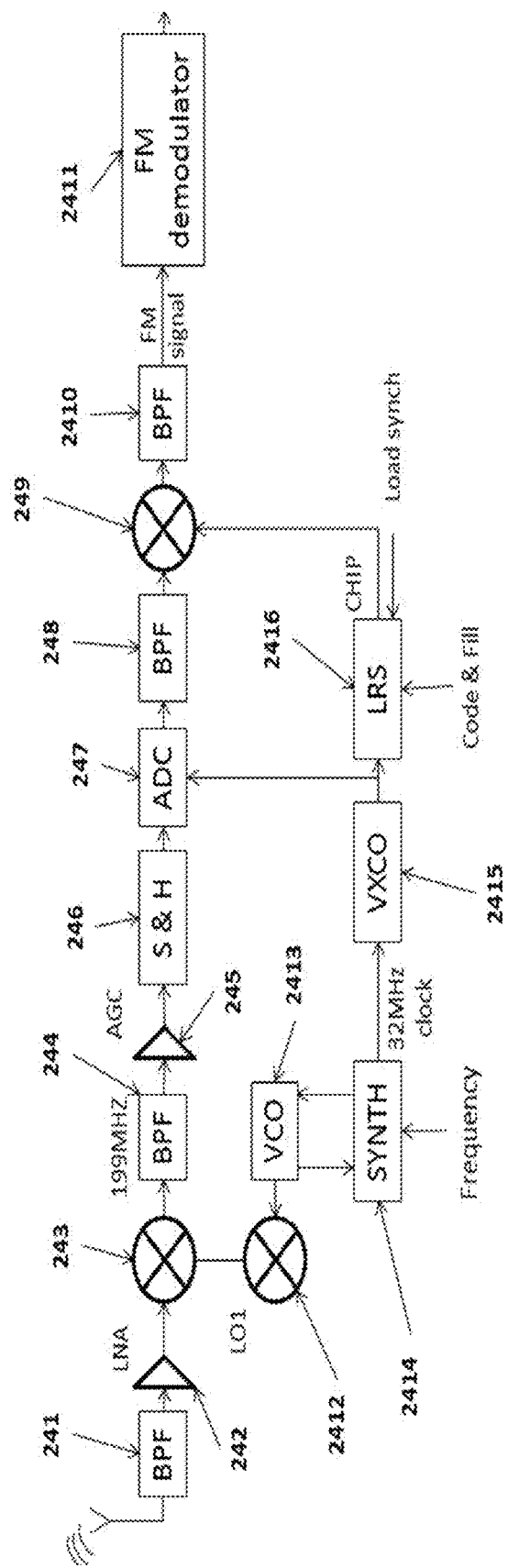
FIG. 24: FM DSSS transmit circuit.

FIG. 24 shows the FM SS RF receiver circuit down to the FM demodulator. The FM SS receiver consists of band pass filter, and amplifier for the received RF signal. It is followed by down-converting the RF signal to an analog IF signal. The DSP performs gain control at 246, sample and hold at 246, and analog to digital conversion on the analog IF signal at 247 and dispreads the discrete time signal at 248. A local spreading sequence generator 2416 is initialized with the user spreading code. At 2414-2415, the synchronization scheme searches for the spreading code phase value that maximizes the dispread pilot tone amplitude. The LFSR at the receiver DSP generates the spreading code waveform locked to the spreading signal at the transmitter within ¼ of the chip period.

Figure 25:
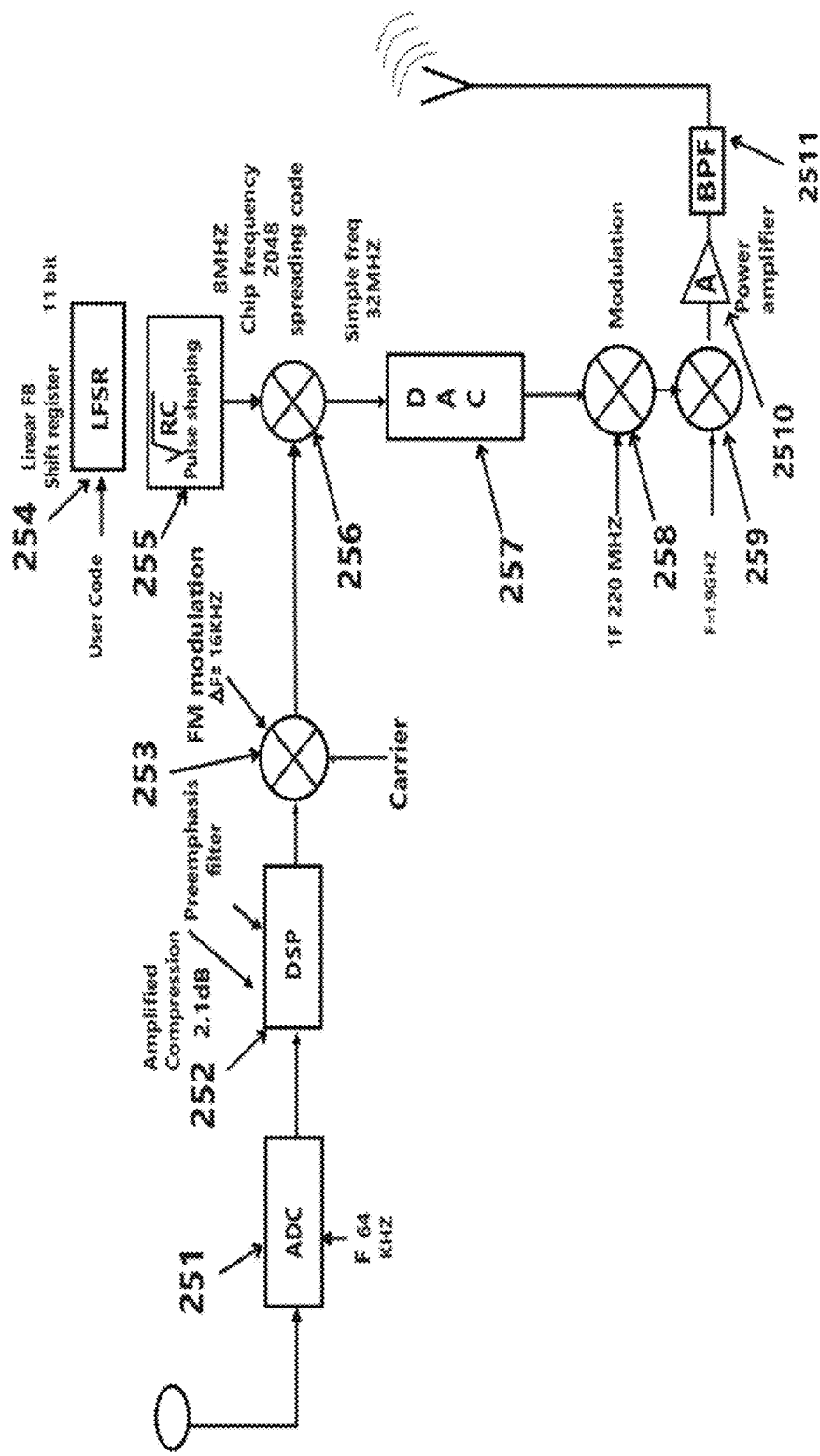
FIG. 25: FM SS phone transmitter circuit.

FIG. 25 shows the FM SS phone transmitter circuit. An eleven bit Linear Feedback Shift Register (LFSR), initialized with the user specific spreading code, operates at 8 MHz chip frequency. The most commonly used linear function of single bits is exclusive-or (XOR). Thus, an LFSR is most often a shift register whose input bit is driven by the XOR of some bits of the overall shift register value. The spreading code is filtered using square-root raised cosine filter.

The FMSS base station hardware processes many channels using many DSP processors. The IF mixer modulates e.g. 8-16 channels (DSP outputs) before transmission. The base-station transmitter supports e.g. 128 trunked channels. Output signals for different DSP units at the base-station are combined after up conversion to the IF.

A Multiple Input Multiple Output (MIMO) antenna is used to enhance throughput and performance of the OFDM down link system using spatial multiplexing and diversity coding. Two units are used on the MT and eight units are used on the base station. For wireless radio-communications, the size of the antenna decreases when the transmitted frequency increases. The same antenna is used for the parallel MC FM SS system.

The system operates using Frequency-division duplexing. Frequency-division duplexing (FDD) means that the transmitter and receiver operate at different carrier frequencies. The platform must be able to send and receive a transmission at the same time, and does so by altering the frequency at which it sends and receives, i.e., duplex mode.

Uplink and downlink sub-bands are said to be separated by the frequency offset. Frequency duplexing is superior to time-division duplexing which tends to waste bandwidth during the switch-over from transmitting to receiving, has greater inherent latency, and may require more complex circuitry. Another advantage of frequency-division duplexing is that it makes radio planning easier and more efficient, since base stations do not "hear" each other (as they transmit and receive in different sub-bands) and therefore will normally not interfere with each other.

Figure 26:
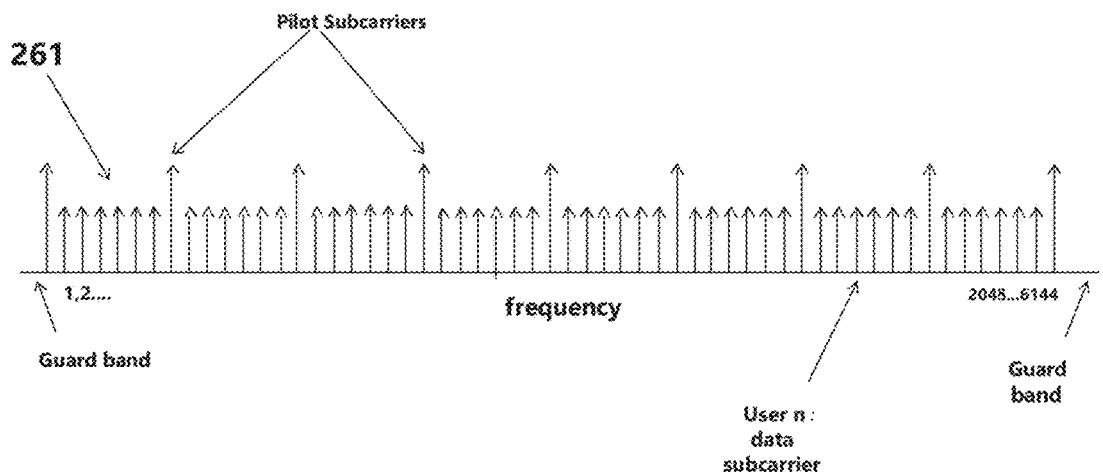
FIG. 26: 1024-4096 carrier of the OFDM and MC FM SS Communication System.

FIG. 26 illustrates an example of the down link frequency spectrum for OFDM. MC FM SS system operates using the guard band and pilot frequencies. Here 1024-6144 total sub-carriers can be used. Of which there is 800-4000 data sub-carriers used on the OFDM modem for 20-100 MHz bandwidth. Pilot signals and guard bands shown in FIG. 26, are added to estimate the channel information in fast fading wireless environment. These frequencies are used by the FM SS system.

The OFDM and the parallel MC FM SS systems discussed in FIG. 26 assume 20-100 MHz bandwidth. The target carrier frequency band is between 2 to 4.7 GHz for best propagation characteristics. The time interval for channel estimation and the subcarrier separation are determined by coherence time and band width of the FM SS channel. For ITU vehicle channel with max RMS delay of 4 usec, the coherence band width is 50 KHz. The channel coherence time calculated from Doppler frequency with 500 km/hr speed is 1.1 msec. The OFDM symbol is assumed as 80 usec. Therefore the subcarrier spacing can be calculated in the range of 9 to 16 KHz. And the FFT size is 1024 to 4096, for 20-100 MHz bandwidth. If the subcarriers are spaced 15 kHz apart from each other, to maintain orthogonality, then this gives an OFDM symbol rate of ¹⁄₁₅ kHz=of 66.7 μs.

Each subcarrier is able to carry data at a maximum rate of 15 ksps (kilosymbols per second). This gives a 20 MHz bandwidth system a raw symbol rate of 18 Msps. In turn this is able to provide a raw data rate of 1.08 Mbps as each symbol using 64-QAM is able to represent six bits. These values increase proportionally as system bandwidth is increased to 100 MHz.

Figure 27A:
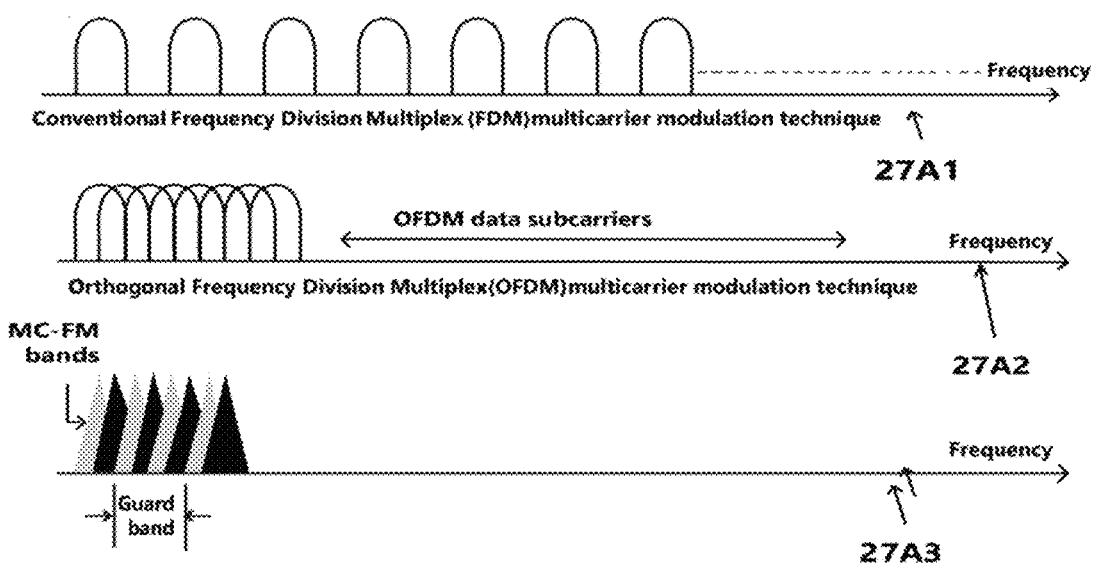
FIG. 27A: Orthogonal Frequency Division Multiplex, guard band.
Figure 27B:
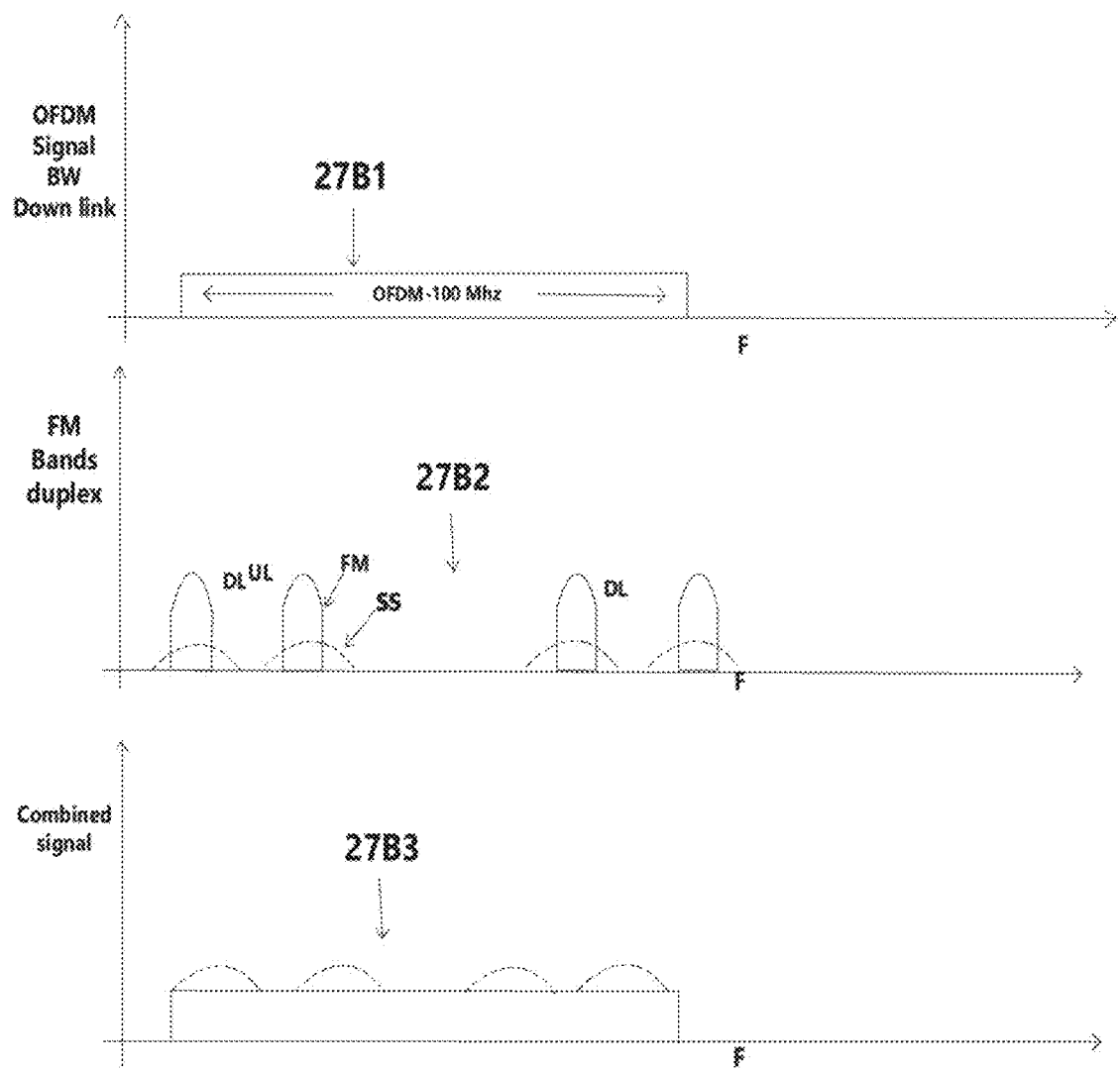
FIG. 27B: The combined transmission of OFDM and FMSS signals.

FIGS. 27a and 27b show pictorial presentations of OFDM orthogonal carriers and MC FM SS implementation. For multiple access the total numbers of subcarriers are divided among different subscribers. These set of subcarriers allocated to different subscribers is designated as sub channels. Hence each subscriber will have different sub channel for data/voice to be transmitted. If a set of 25 guard ring subcarriers is assigned to the MC FM system operating by CPFSK, then the assigned bandwidth and data rate will be 375 KHz, 200 kbps. Therefore if a rectangular-pulse polar baseband signal is used to modulate an RF carrier in FSK. If the baseband signal has a data rate of 200 kbit/sec and the two RF frequencies are 150 kHz apart, The bit period in the baseband signal is $T=1/200000$ seconds, and the baseband pulses are rectangular. The bandwidth of the baseband signal (to the first null) is given by $B=1/2T$ For the RF components, $2\Delta f=150$ kHz.

The bandwidth of the FSK signal is therefore given by the equation

CPFSK bandwidth=$2\Delta f+2B$=150 kHz+200 kHz=350 kHz

This is the bandwidth prior to SS time spreading. The transmitted data may be addressed to the MT of one or multiple subscribers. The data can be FSK modulated on one or several carrier bandwidths, i.e., one faster data stream or several parallel slower streams.

Orthogonal Frequency Division Multiplex, Guard Band.

FIG. 16 presents one implementation of the OFDM base station with a CPFSK transmitter incorporated in the MC FM SS platform IP. The data $d_m$ is modulated by either BPSK, QPSK or 16-QAM schemes. These modulated sets of complex data are passed on to a serial to parallel converter. The parallel data is multiplied by various PN codes CO to Cn and these data sub-streams are assigned to orthogonal sets of carriers g0 to gn to achieve OFDM spectrum which forms one symbol. The same is done for all the subscriber stations at the base station to form OFDM data. Multicarrier MC FM SS signal spectrum is a subset of OFDM subcarriers using guard ring frequencies. For MC FM SS non coherent FSK or CPFSK modulation is used.

A number of alternative possibilities exist as to how this frequency domain spreading can take place, such as by using a long PN code and multiplying each data symbol, $d_1$, on a subcarrier by a chip from the PN code, $c_i$, or by using short PN codes and spreading each data symbol by an individual PN code—i.e. $d_i$ is multiplied by each $c_i$ and the resulting vector is placed on $N_{freq}$ subcarriers, where $N_{freq}$ is the PN code length.

Once frequency domain spreading has taken place and the OFDM subcarriers have all been encoded with an OFDM symbol, the OFDM guard interval is then added with the CPFSK data and, if transmission is in the downlink direction, each of these resulting symbols are added together prior to transmission.

An alternative form of multi-carrier FM SS, performs spreading in the time domain only, rather than in the frequency domain, i.e., utilize two RF frequencies subcarriers spaced by e.g. 10 subcarrier spacing. When OFDM is used as the modulation scheme, the data symbols on the individual subcarriers are spread in time by multiplying the chips on a PN code by the data symbol on the subcarrier. For example, assume the PN code chips consist of $\{1, -1\}$ and the data symbol on the subcarrier is $-j$. The symbol being modulated onto that carrier, for symbols 0 and 1, will be $-j$ for symbol 0 and $+j$ for symbol 1.

Figure 28:
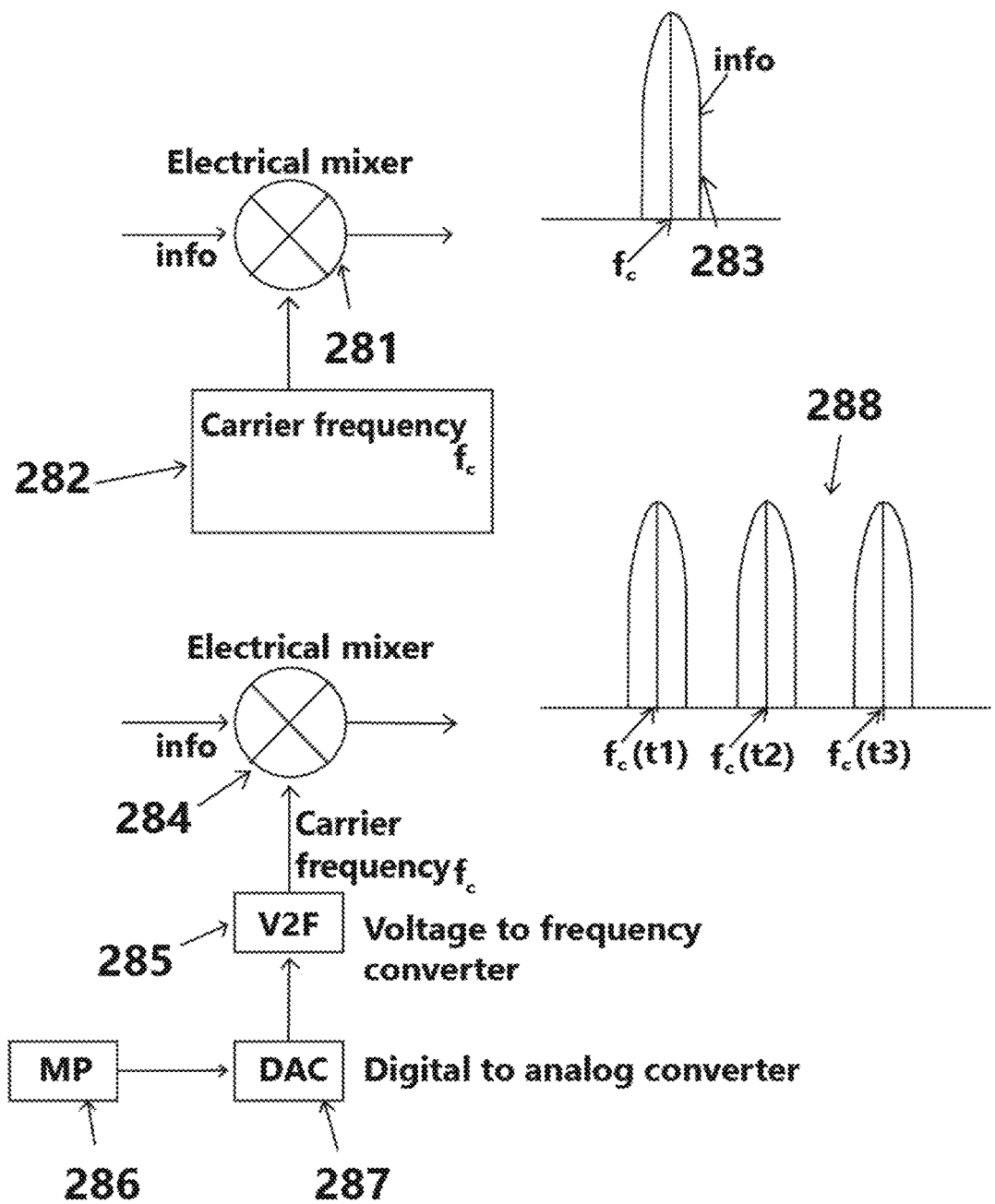
FIG. 28: FM SS Communication System with carrier hopping capability.

FIG. 28 shows an FM transceiver that utilizes a Frequency-hopping system by transmitting the encoded data on several different subcarrier frequencies. Hopping from one frequency to another can be used to reduce interference effect. Typically such a system may have many frequencies to choose from, and has several outputs produced by frequency hopping. The FM data is mixed with a carrier frequency. The carrier frequency is changed through a voltage to frequency converter controlled by a DAC and microprocessor. In addition a pilot frequency can be transmitted with the FM data and used to optimize receiver tuning. FIG. 28 shows the FM system transmitting on three different subcarrier locations at different time intervals.

Figure 29A:
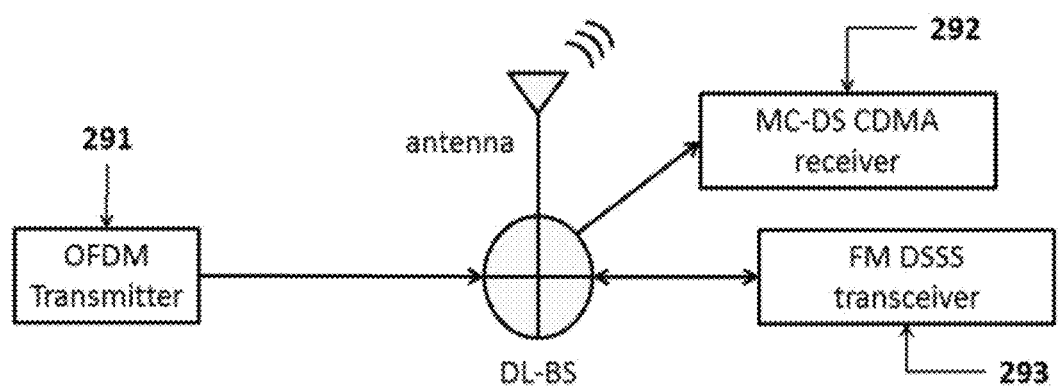
FIG. 29: 4G communication system.
Figure 29B:
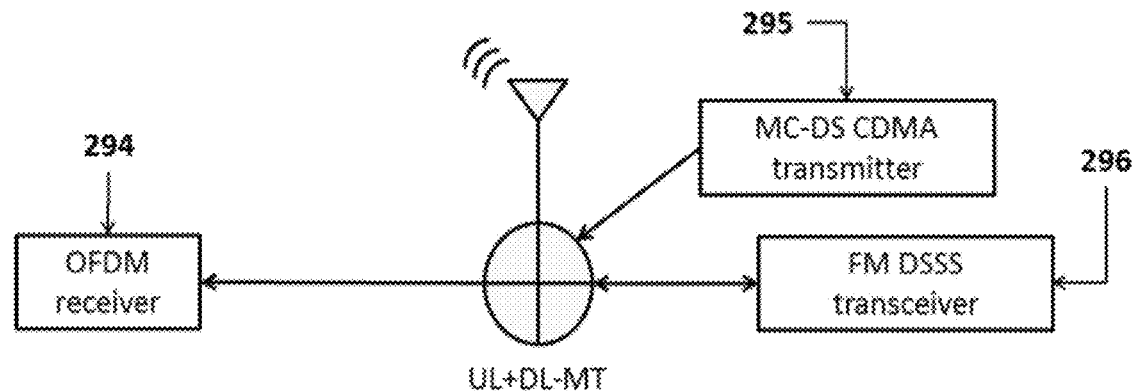

FIGS. 29A and 29B show the proposed modification to the 4G communication system. FIG. 29a shows the base station DL hardware. FIG. 29b shows the MT hardware for the UL and the DL. As shown in FIG. 29A, the base station hardware incorporates the MC-DS-CDMA receiver, the OFDM transmitter and the FM SS transceiver. As shown in FIG. 29B, the MT hardware incorporates the MC-DS-CDMA transmitter, the OFDM receiver and the FM SS transceiver.

Figure 30:
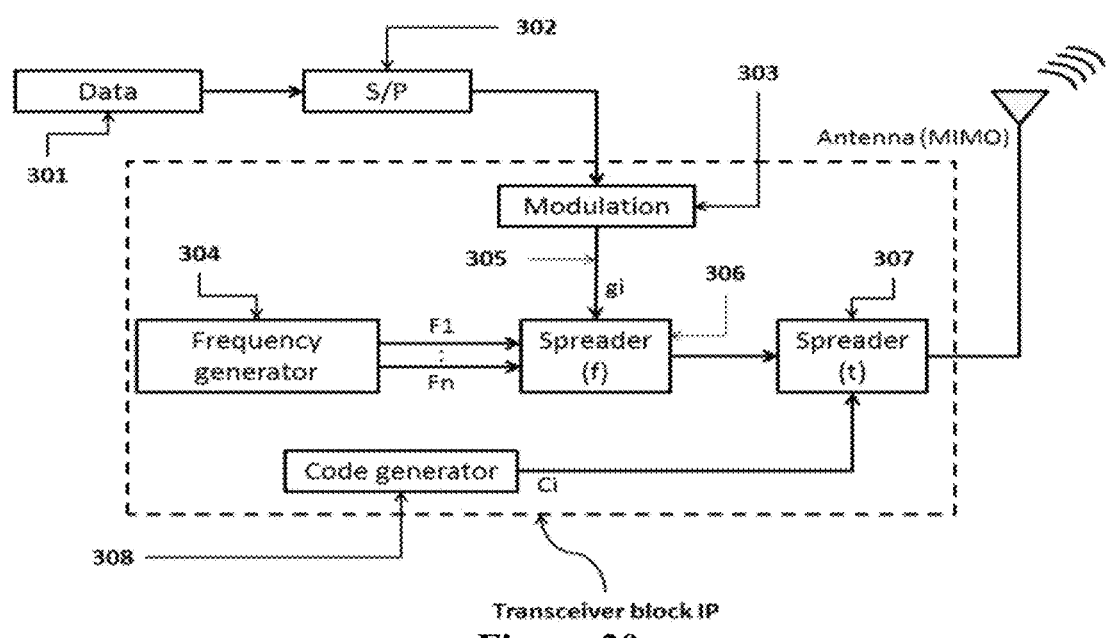
FIG. 30: Simplified block diagram for frequency and time spreading (Down Link).

FIG. 30 shows a 2-dimensional spreading of data in both the frequency and time domains, and a block diagram of the scheme that uses 2-D spreading for OFDM down link, or for FM SS system that modulates several parallel subcarriers.

As an example of how the 2D spreading works, the first data symbol, $d_0$ uses a spreading factor in the time domain, $SF_{time}$, of length 4, and a spreading factor in the frequency domain, $SF_{frequency}$ of 2, then the data symbol, $d_0$, will be multiplied by the length-2 frequency-domain PN codes and placed on subcarriers 0 and 1, and these values on subcarriers 0 and 1 will then be multiplied by the length-4 time-domain PN code and transmitted on OFDM symbols 0, 1, 2 and 3.

NTT DoCoMo reports have achieved 5 Gigabit/s transmissions to receivers travelling at 10 km/h in a 4G prototype system developed with a 100 MHz-wide channel using similar VSF-OFDM architecture.

The transceiver IP block contains a programmable time and frequency code generators and f and t spreader for the input modulated data stream.

Figure 31:
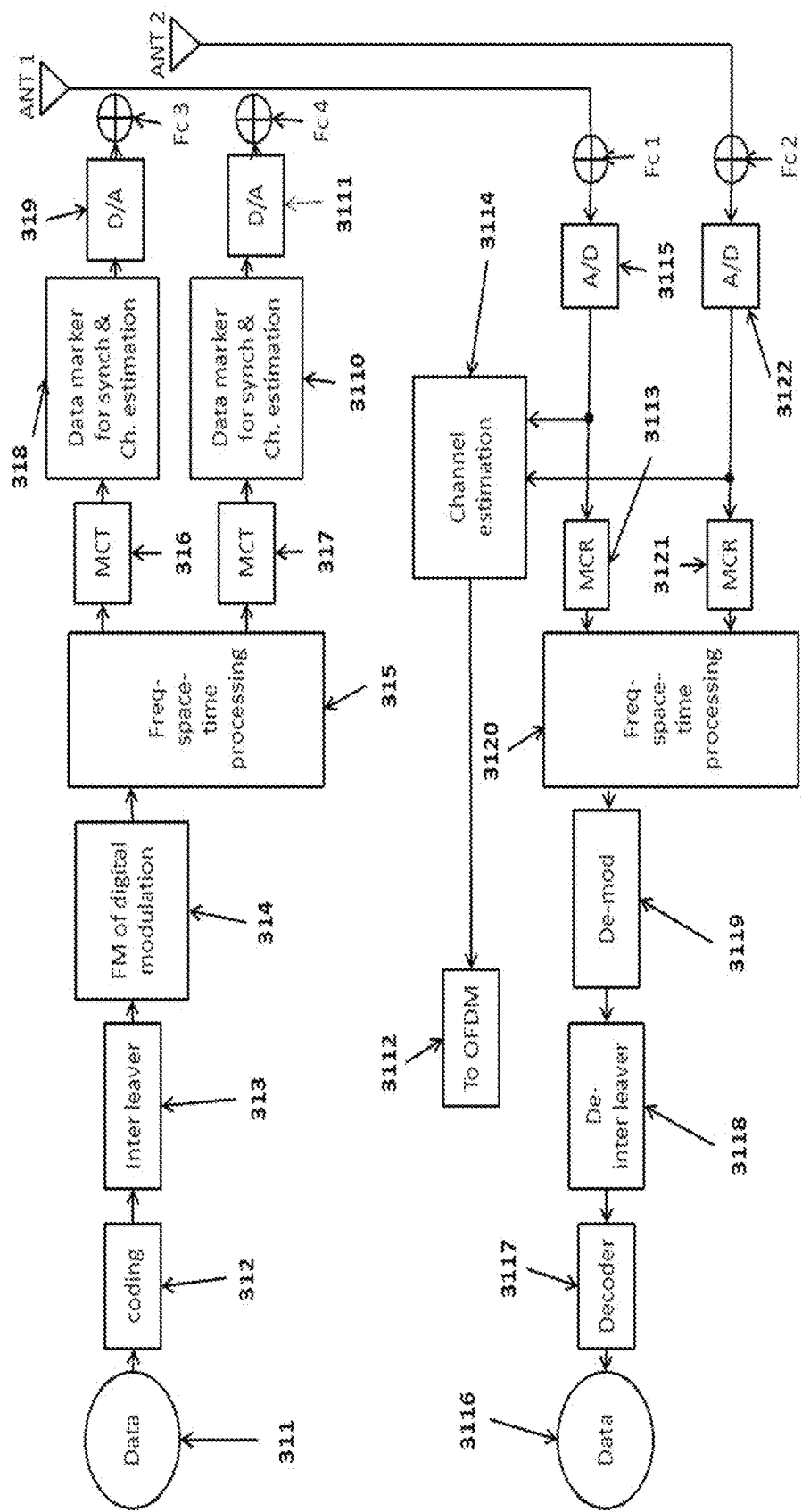
FIG. 31: Block diagram of MCFMSS Mobile Terminal.

The OFDM 4G system and the superimposed MCFMSS system operate with two MT antennas and eight BS antennas. The MCFMSS system architecture is designed as shown on FIGS. 31 and 32. A simplified block diagram of the MCFMSS hardware in the MT is shown in FIG. 31. It is composed of a preprocessing circuit followed by FM digital modulation, frequency space and time spreading, multi carrier transmitters, data marker insertion, DAC and RF stages. FIG. 31 shows the MC FM SS system where the modulation index of the FM output is controlled by digital circuits and DSP/micro-controller software. The MC FM SS systems shown illustrate multiple transceivers that use multiple different chipping codes and multiple antennas.

Figure 32:
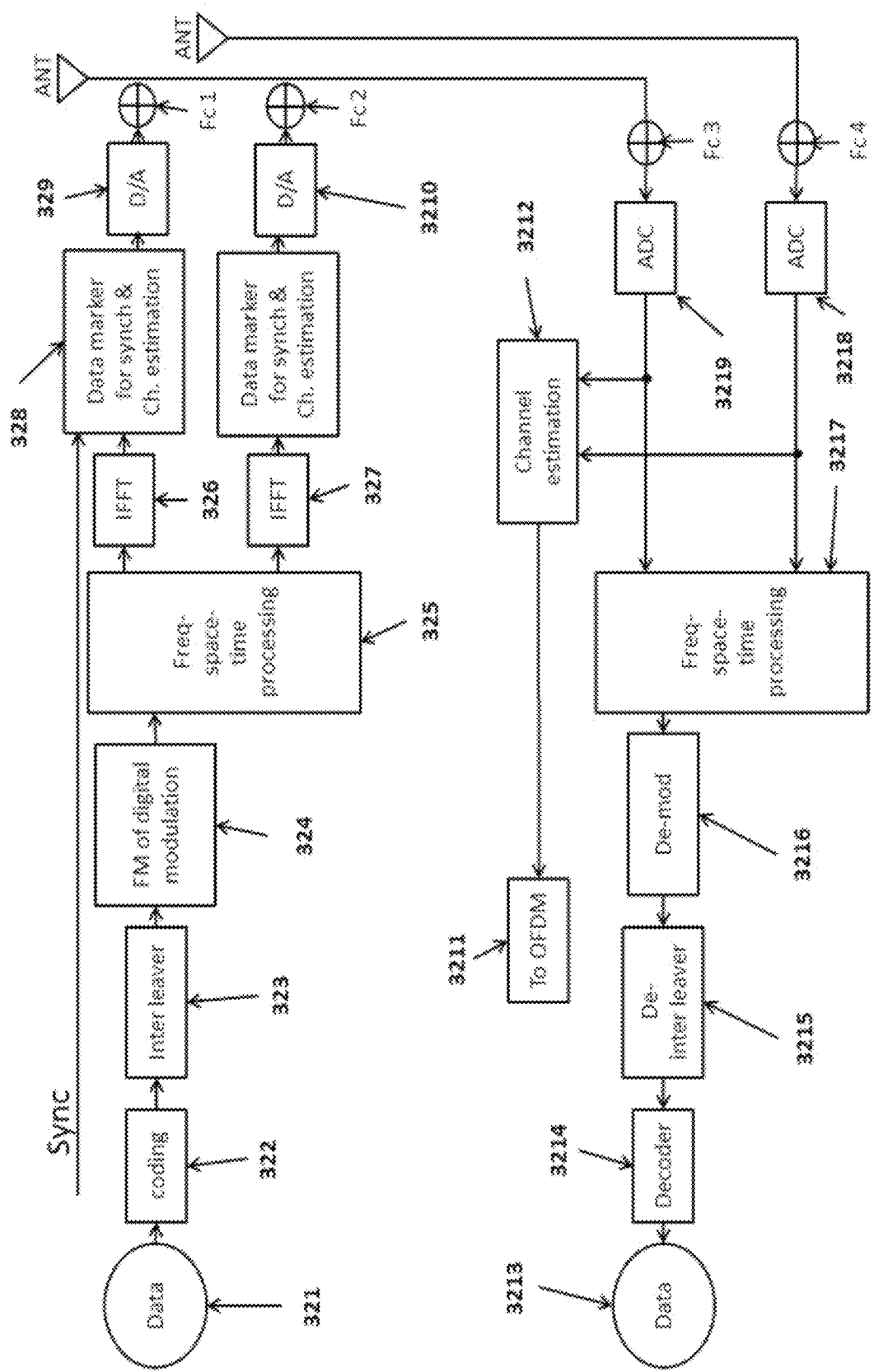
FIG. 32: Block diagram of a MCFMSS base station.

The corresponding hardware in the base station is shown in FIG. 32. The hardware is similar to that in FIG. 31. Carriers 1, 2 are used in the DL and carriers 3, 4 are used in the uplink. Both figures show that channel estimation is performed by markers placed on the transmitted carriers and fed to the OFDM system. The system operates in parallel with 4G OFDM system and feeds it the channel estimation data. This in turn will control OFDM system function blocks such as adaptive modulation, codes, and adaptive power control (APC).

DETAILS OF THE DRAWINGS IN THE CONTEXT OF THE PREFERRED EMBODIMENTS

FIG. 1 shows direct sequence spread spectrum where incoming data 11 is fed to a spreading process 12. Spreading processors are located in the mobile terminal and base station, and assign a different spreading code to each user. Reference numeral 13 represents the users' codes versus time. Therefore, the receiver of each user is capable of tuning out transmissions received by other users.

Figure 2:
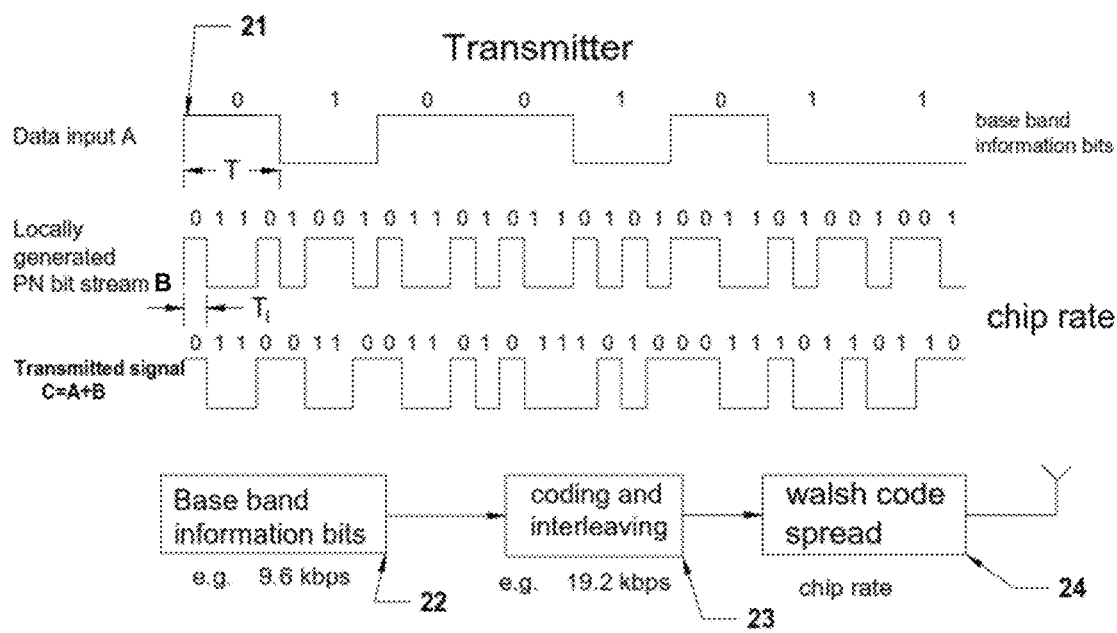
FIG. 2: DSSS spreading of a data sub-stream.

FIG. 2 shows an example of the DSSS spreading process. The diagram illustrates that the data input A (Base Band) 21 is multiplied by a locally generated PN bit stream (B) to generate the transmitted bit stream (C) that will be transmitted on the RF carrier. The hardware implementation includes base band bit coding 22 and interleaving 23 according to the linear predictive coding ("LPC") vocoder. This is followed by the spreading using Walsh Code 24. The spreading applies the following exclusive OR Boolean Equation:

$$C = A \oplus B$$

The data stream is delivered to the mobile terminal. Base band information bits are derived from the data stream at 9.6 KBPS 2. Data input (A) is extracted from the coding and interleaving stage at 19.2 KBPS 3. Locally generated PN bit stream is XOR multiplied by data input (A) to produce Chip Rate 4. This will form the transmitted signal.

Figure 3:
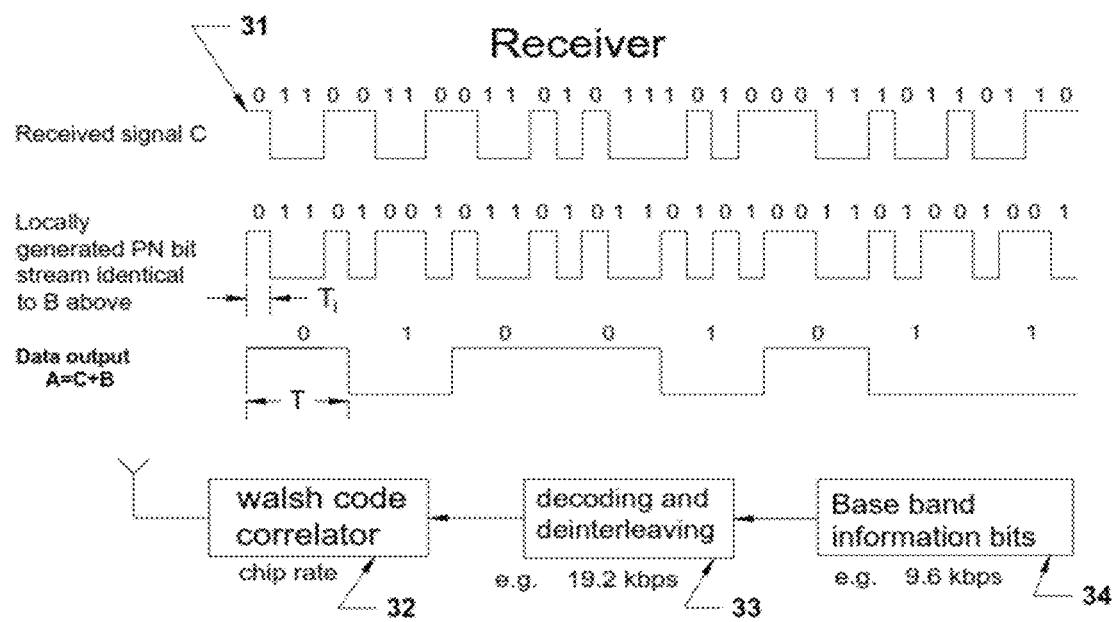
FIG. 3: DSSS spreading of a data sub-stream.

FIG. 3 shows DSSS de-spreading of the data sub-stream, where the data stream at Chip Rate is obtained from transmitted signal 31, received from RF stages. Walsh Code Correlator 32 applies locally generated PN bit stream is XOR multiplied by received signal. It generates data output (A) after de interleaving 33 and base band information bits 34.

Figure 4:
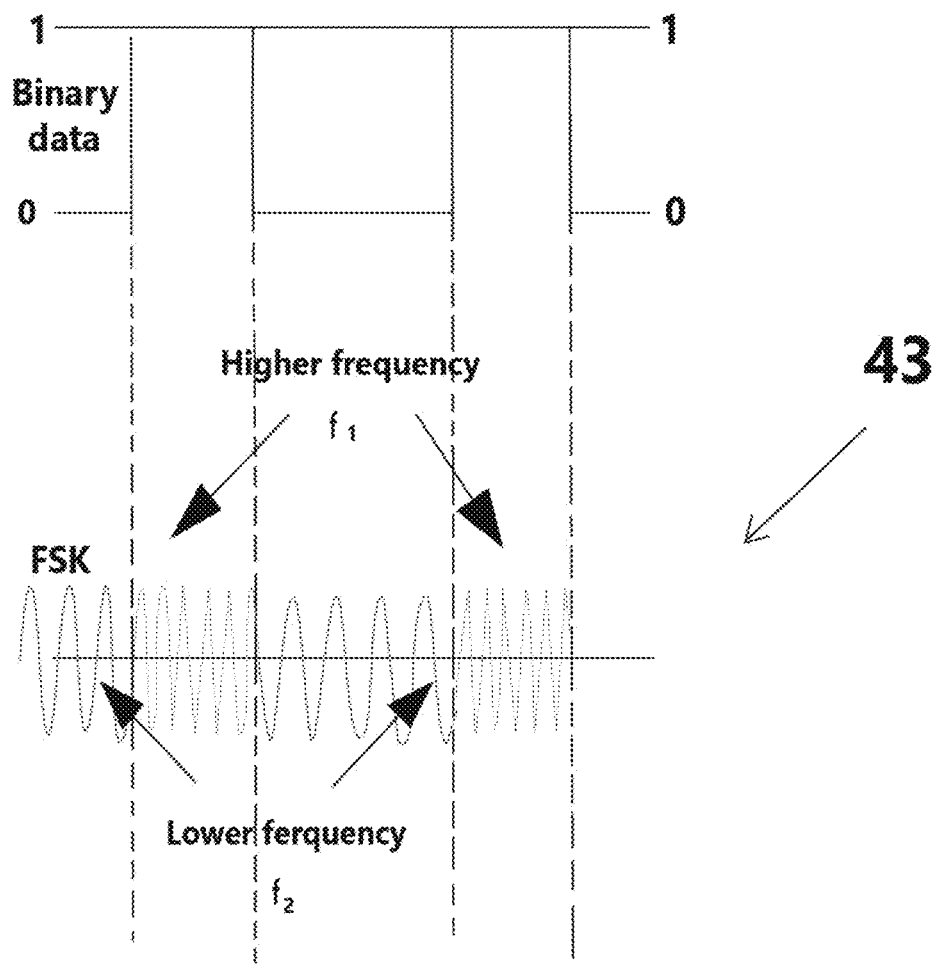
FIG. 4: Frequency Shift Keying (FSK) 1-F1,0-F2.

FIG. 4 shows Frequency Shift Keying (FSK) 1-F1, 0-F2 where waveform 43 illustrates the modulation of input binary data using Frequency Shift Keying. Here binary state 1 is represented by frequency F1. Binary state 0 is represented by frequency F2.

Figure 5A:
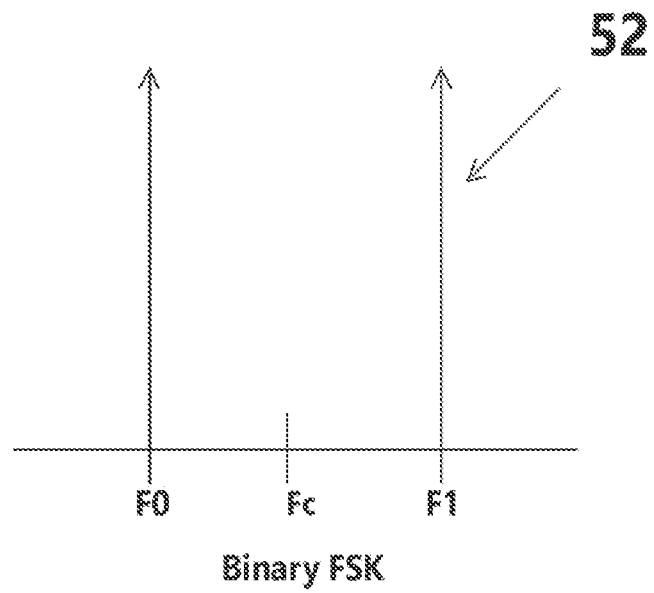
FIGS. 5A and 5B: Binary Frequency Shift Keying (FSK) and Frequency Shift Keying (4-ARY FSK) 2 Bit/Frequency Symbol, respectively.
Figure 5B:
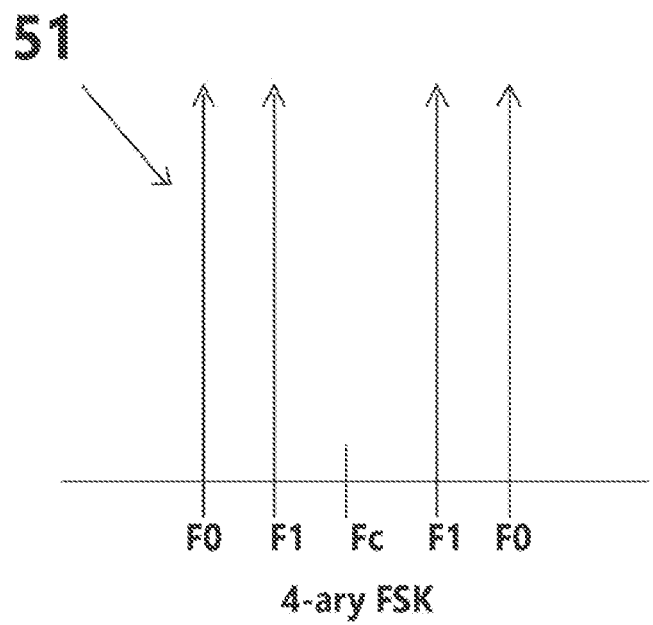

FIGS. 5A and 5B show Frequency Shift Keying (4-ARY FSK) 2 bit/frequency symbol where waveform 52 represents binary Frequency Shift Keying (FSK). Here binary state 0 is represented by F0 and binary state 1 is represented by F1. Waveform 51 represents 4-ARY binary Frequency Shift Keying (FSK). Here binary state 00 is represented by FC-F0 and binary state 10 is represented by FC-F1. Binary state 01 is represented by FC+F1, and binary state 11 is represented by FC+F0. As an example Frequency Shift Keying of sinusoidal carrier signal, two-digit code is an information signal. The frequency of 1 KHZ matches digital code "0," 2 KHZ—"1," 3 KHZ—"2," 4 KHZ—"3".

Figure 6:
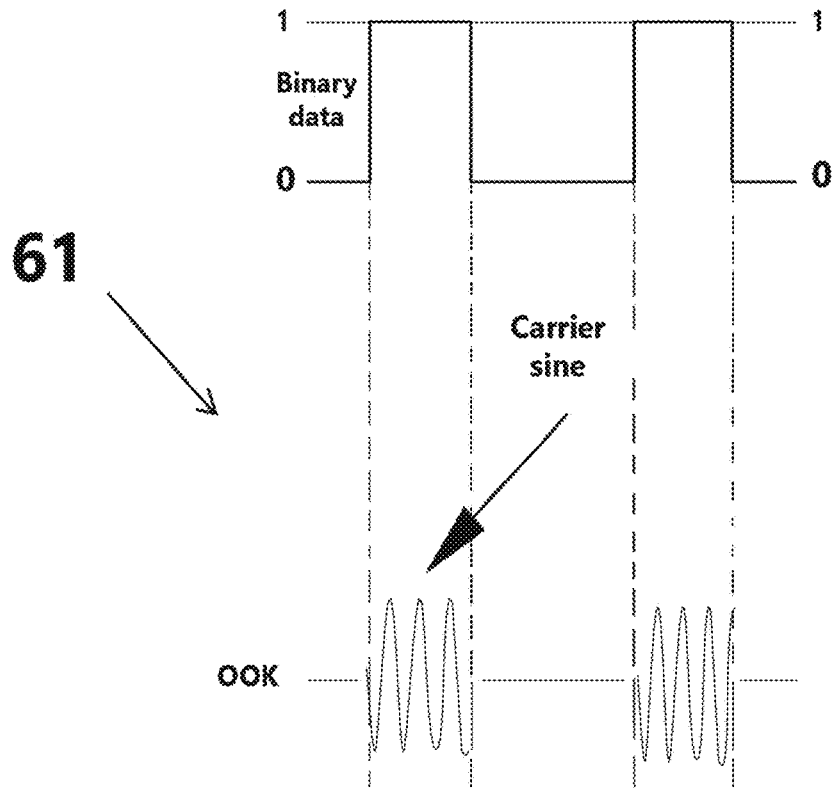
FIG. 6: On-Off Keying of a sine wave carrier.

FIG. 6 shows On Off Keying (OOK) of the sine wave carrier signal. On Off Keying is the simplest form of Amplitude-Shift Keying (ASK) modulation that represents digital data as the presence or absence of a carrier wave. In its simplest form, the presence of a carrier for a specific duration represents a binary one, while its absence for the same duration represents a binary zero as shown on waveform 61.

Figure 7:
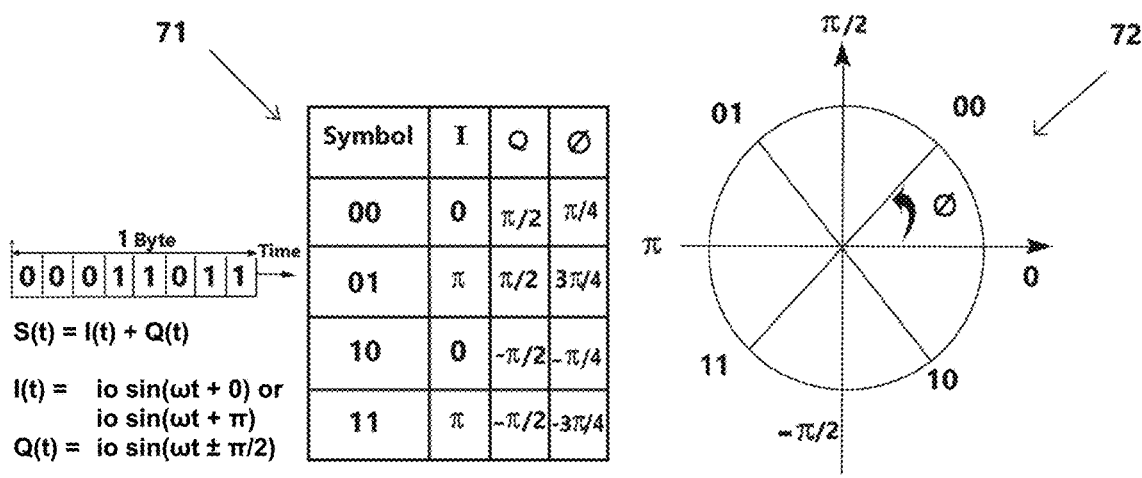
FIG. 7: QPSK can encode two bits per symbol, used in W-CDMA.

As shown in FIG. 7, QPSK can encode two bits per symbol, used in W-CDMA. In a QPSK waveform, information is in the amplitude and phase 71. In the Constellation diagram of QPSK 72 with Gray Coding shown in FIG. 7, adjacent symbols only differ by one bit.

Figure 8:
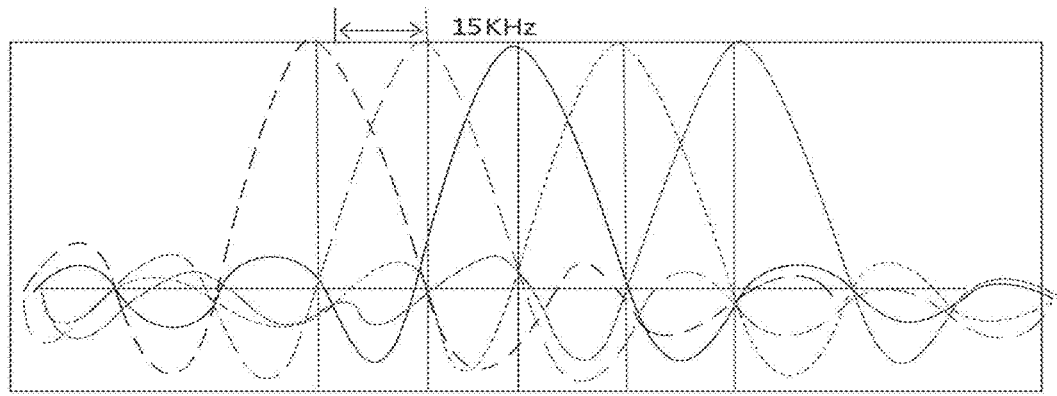
FIG. 8: Orthogonal subcarriers of OFDM.

FIG. 8 shows Orthogonal subcarriers of OFDM Power versus frequency of OFDM subcarriers, showing 15 KHz subcarrier separation. IFFT applied to eliminate individual modulated data-subcarrier multipliers.

Figure 9:
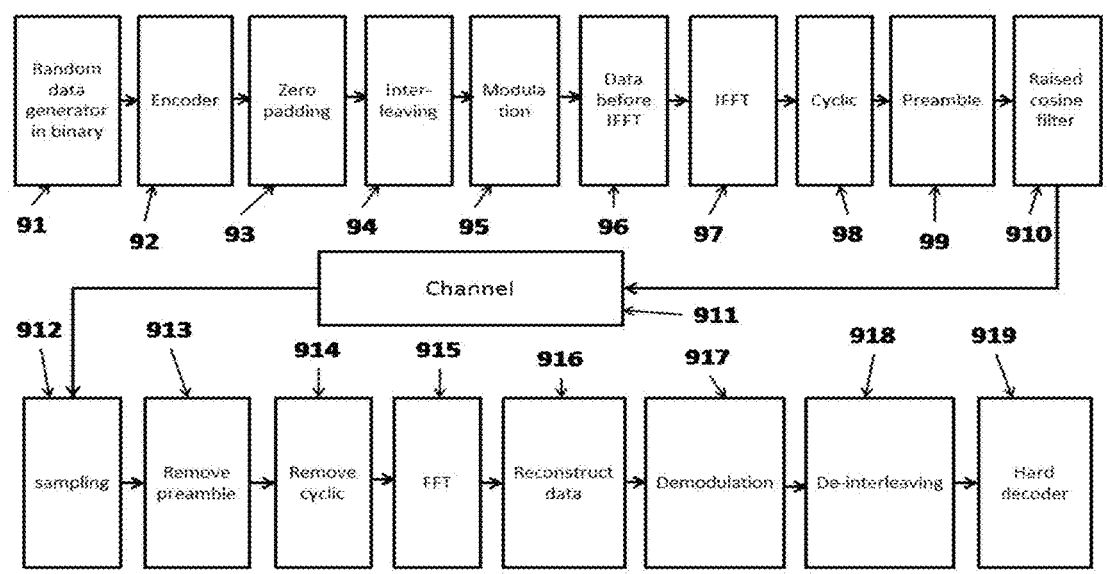
FIG. 9: OFDM transmitter and receiver block diagram.

FIG. 9 shows an OFDM transmitter and receiver block diagram. The transmitter first converts the input data from a serial stream to parallel sets. Each set of data contains one modulated symbol, SI, for each subcarrier. For example, a set of four data would be [S0 S1 S2 S3]. Before performing the Inverse Fast Fourier Transform (IFFT), this example data set is arranged on the horizontal axis in the frequency domain. The symmetrical arrangement about the vertical axis is necessary for using the IFFT to manipulate this data. An Inverse Fourier Transform converts the frequency domain data set into samples of the corresponding time domain representation of this data. Specifically, the IFFT is useful for OFDM because it generates samples of a waveform with orthogonal frequency components. Then, the parallel to serial block creates the OFDM signal by sequentially outputting the time domain samples. The channel simulation will allow examination of the effects of noise, multipath, and clipping. by adding random data to the transmitted signal, simple noise can be simulated. Multipath simulation involves adding attenuated and delayed copies of the transmitted signal to the original. This simulates the problem in wireless communication when the signal propagates on many paths. For example, a receiver may see a signal via a direct path as well as a path that bounces off a building. Finally, clipping simulates the problem of amplifier saturation. This addresses a practical implementation problem in OFDM where the peak to average power ratio is high. The receiver performs the inverse of the transmitter. First, the OFDM data are split from a serial stream into parallel sets. The Fast Fourier Transform (FFT) converts the time domain samples back into a frequency domain representation. The magnitudes of the frequency components correspond to the original data. Finally, the parallel to serial block converts this parallel data into a serial stream to recover the original input data.

FIG. 10 shows a combination of FM and DSSS modulation. The frequency spectrum of FM modulated signal is a narrow band with bandwidth of 2($\Delta$F+FM) for FM modulating frequency and $\Delta$F is the maximum frequency shift of the instantaneous carrier frequency. Alternatively the FM spectrum bandwidth is ($\Delta$F+R), where R is the bit rate and F or $\Delta$F is the frequency deviation or shift between the one and zero frequencies (FSK) (see waveform 101). Applying the Pseudo Random Sequence to the FM spectrum results in a wider spectrum with bandwidth BC which is equal to the FM bandwidth BFM times the processing gain (G) (see waveform 102). The processing gain is the ratio of the chip code rate and the data rate or $T_{FM}/T_c$ (see waveform 103).

FIG. 11 shows FM DSSS modulation waveforms, where an analog signal is FM modulated, digitized at 16 KHZ, then a SS Chip Code which is 2048 pulses per second in length is applied to the data, resulting in a 32 MHZ signal, which is applied to the RF carrier.

FIG. 12 shows a block diagram of a DOCOMO 4G wireless system showing a mobile terminal 121 and a base station 123 connected by VSF OFDM Down-Link 122 and MC/DS CDMA Up-Link 125, as well as by a duplex MC-FM SS with MC-FM-SS 124.

FIG. 13A shows a DS CDMA receiver with RF amplifier 13A1 feeding first mixer 13A2 with RF oscillator 13A5. The down converted signal from the first mixer is fed to second mixer/correlator 13A3, which is also fed by IF oscillator 13A9 encrypted by PN generator 13A8 via third mixer 13A6. The output data after de spreading is filtered by LPF 13A4.

As shown in FIG. 13B, a MC DS-CDMA modulator, up link, with two data subcarriers is constructed by XOR gates 13B1, 13B5 combining data sub streams data1 and data2, respectively, with a PN sequence. The sub-stream ("SS") data is fed to BPSK modulators 13B2, 13B6 and IF oscillators 13B3, 13B7, respectively, and combined at 13B4 to form a CDMA output.

FIGS. 14A and 14B together show a block diagram of an MC FM-DSSS system where the transmitter is shown in FIG. 14A and the receiver is shown in FIG. 14B. Data 145 is presented at ADC 141 and fed to CPFSK modulator 142, which modulates the data. The modulated data is spread into several frequencies using spreader 143 and spreading code generator 146. Thereafter the data is spread using PN sequence generators 147 and 144. RF up conversion and transmission follows. The inverse operations are performed at the receiver.

FIG. 15 shows a simplified block diagram for frequency and time spreading (Down Link) where the data 151 pass through serial to parallel converter 152, before modulation 153 is applied to the parallel data streams. These parallel data streams are applied to frequencies selected by spreaders 154 and 156. PN sequence spreading follows in blocks 157 and 158.

FIG. 16 shows an MC-FM-SS base station implementation in which an FM-DSSS IP block (Down Link) 161 is placed in parallel with OFDM Down Link blocks 163, 165, which receive the data after interleaving and serial to parallel conversion block 162. The OFDM and FM SS signals are summed in summer 164 before transmission.

FIG. 17 shows a non-coherent binary FSK demodulator and square law detector. The upper two branches (integrators 172 and 175, and square law processors 173 and 176) are configured to detect f1 (171-176), and the lower two branches (integrators 179 and 1713), square law processors 1710 and 1714) are configured to detect F2. Decision block 177 processes the output of the integrators 172, 175, 179, and 1713 and the square law processors 173, 176, 1710, and 1714 to determine the binary state of the data. Each detector block processes the (I) and (Q) data phase signals received.

Figure 18:
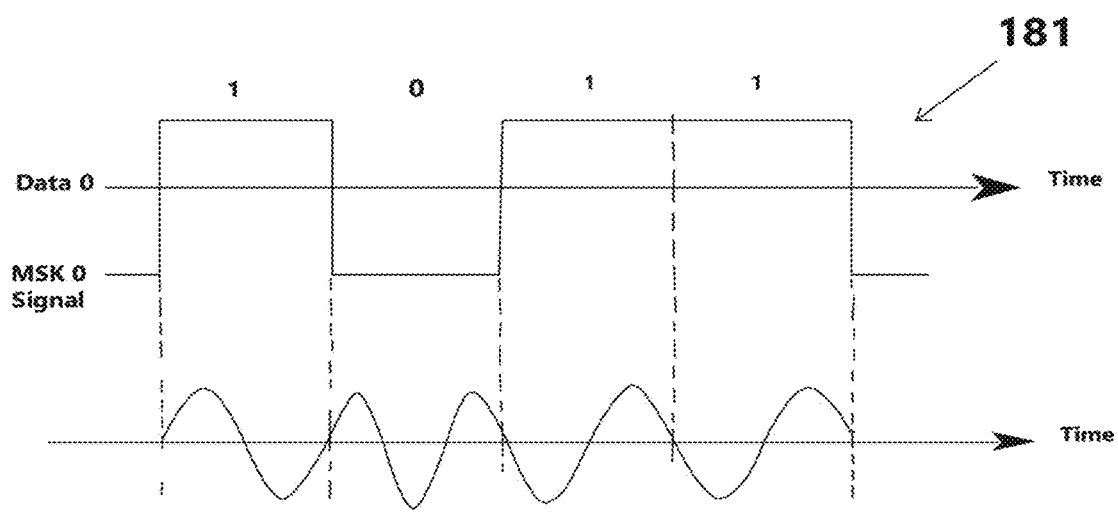
FIG. 18: Signal using MSK modulation for single data stream.

FIG. 18 shows a signal 1 using MSK modulation for a single data stream input 181. The main attributes of MSK, are constant envelope, spectral efficiency, and error rate performance. This arises as a result of the unique factor of MSK that the frequency difference between the logical one and logical zero states is always equal to half the data rate. This can be expressed in terms of the modulation index, and it is always equal to 0.5.

Figure 19:
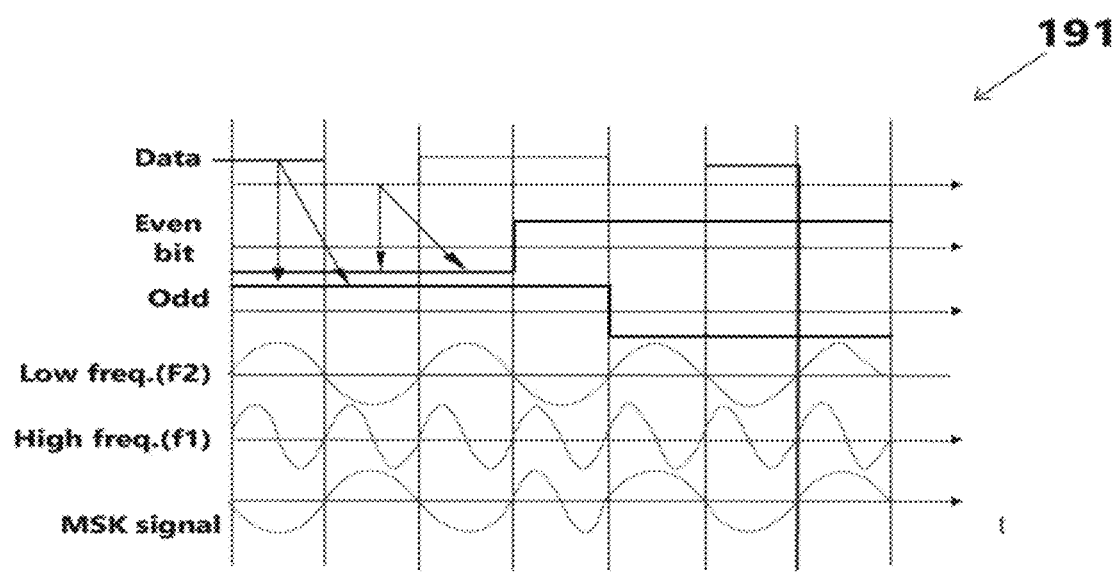
FIG. 19: Signal using MSK modulation for dual odd/even data stream.

FIG. 19 shows a signal 1 using MSK modulation for a dual Odd/Even data stream, where input data stream 191 is split to odd and even bit streams. MSK uses changes in phase to represent 0's and 1's, but unlike most other keying, the pulse sent to represent a 0 or a 1 not only depends on what information is being sent, but what was previously sent. The pulse used in MSK is the following:

$$S(t)=(2E_b/T_b)^{0.5} \cos(2\pi f_c t+\theta(t))$$

where $\theta(t)=\theta(0)+\pi h/T_b$ if 1 was sent $\theta(t)=\theta(0)-\pi h/T_b$ if 0 was sent.

$f_c=(f_1+f_2)/2$ $h=(f_1-f_2)T_b$

Even though MSK's power spectrum density falls quite fast, it does not fall fast enough so that interference between adjacent signals in the frequency band can be avoided. To take care of the problem, the original binary signal is passed through a Gaussian shaped filter before it is modulated with MSK. FIG. 20 shows the spectral density of the MSK and GMSK signals, signal amplitude versus normalized frequency. The principle parameter in designing an appropriate Gaussian filter is the timebandwidth product WTb. Note that MSK has a time-bandwidth product of infinity. As can be seen from above, GMSKs power spectrum drops much quicker than MSK's. Furthermore, as WTb is decreased, the roll-off is much quicker.

Figure 21:
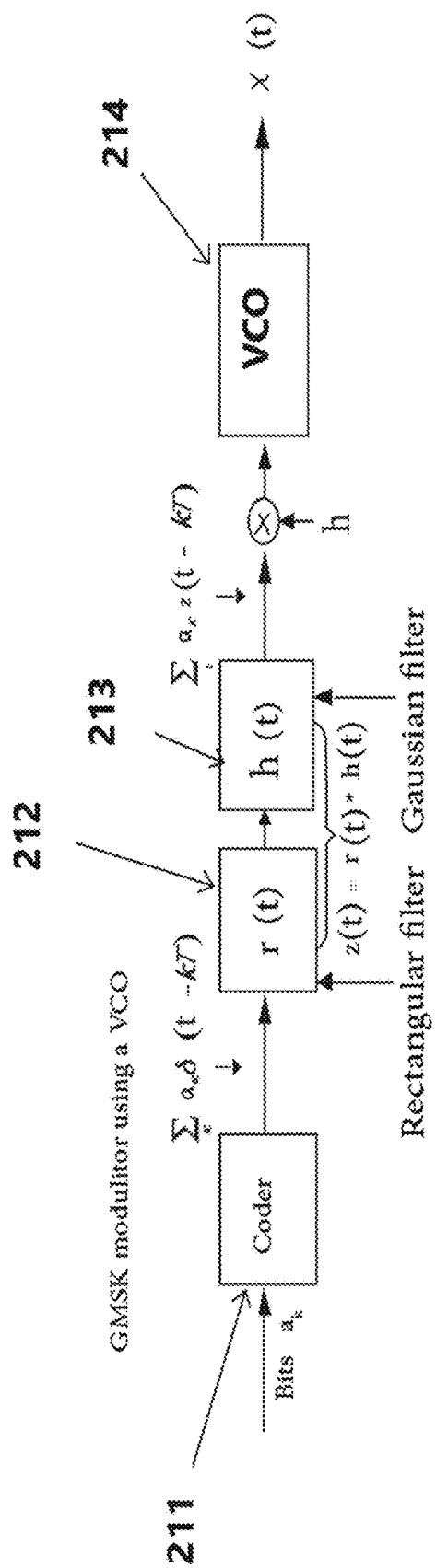
FIG. 21: GMSK modulator using a VCO.

FIG. 21 shows a GMSK modulator using a VCO 214 which is fed from rectangular filter 212 and Gaussian filter 213. The coder 211 feeds the data stream to the rectangular filter 212.

FIG. 22 shows a GMSK quadrature modulator without VCO. The quadrature (I-Q) modulators 224, 225 uses one signal that is said to be in-phase and another that is in quadrature to this (Imaginary Component). Cos $(2\pi f_c t)$ and sin $(2\pi f_c t)$ are called quadrature carriers because they have a phase difference equal to $\pi/2$. The two signals ZI and ZQ are called quadrature components because they modulate the two quadrature carriers. The I and Q components are generated by taking the sine and cosine of output of the filter-integrator 223. These signals generate the GMSK output once passed through the modulator. Using this type of modulator the modulation index can be maintained at exactly 0.5 without the need for any settings or adjustments. This makes it much easier to use, and capable of providing the required level of performance without the need for adjustments. The integrator 223 is fed from the filter 222, which is fed by the coded input data 221. What is 226? Insert description.

FIGS. 23A and 23B together show a simplified block diagram of a single carrier FM-DSSS system. The system performs the function of a mobile terminal or acts as a transceiver in parallel with W-CDMA in a Wideband Smart Phone (WBSP). In this example voice data 231-233 is FM modulated in step 234 in a 16 kHz bandwidth, and thereafter the data is time spread by a PN code sequence to a 32 MHZ bandwidth using a spreader 236 which is fed by a user code generator 235. This is followed at step 237 by carrier mixing with IF (220 MHZ) and RF (1.9 GHZ) frequencies. The FM MOD/DE-MOD are preceded and followed by the emphasis and de-emphasis filtering circuits 231, 239 on the voice signal. The receiver performs the reverse steps described above.

FIG. 24 shows the DS FM SS RF receiver circuit down to the FM demodulator 2411. The DS FM SS RF receiver includes a band pass filter (BMP) 241, and an LNA amplifier 242 for the received RF signal. Following the LNA amplifier 242, the signal is downconverted at 243 and then transmitted to BFP 244. The DSP performs gain control 245, sample and hold 246, and analog to digital conversion 247 on the analog IF signal using AGC 5, S&H 6, ADC7, and BPF 8, and dispreads the discrete time signal at 249 and 2416. A local spreading sequence generator 2416 is initialized with the user spreading code. At 2414-2415, the synchronization scheme searches for the spreading code phase value that maximizes the dispread pilot tone amplitude. The LFSR at the receiver DSP module generates the spreading code waveform locked to the spreading signal at the transmitter within ¼ of the CHIP period.

FIG. 25 shows the FM SS phone transmitter circuit. The input is fed to ADC 251, and followed by DSP 252 and FM modulation 253. An eleven bit Linear Feedback Shift Register (LFSR) 254, initialized with the user specific spreading code, operates at an 8 MHZ CHIP frequency. The most commonly used linear function of single bits is Exclusive-OR (XOR). Thus, an LFSR is most often a shift register whose input bit is driven by the XOR of some bits of the overall shift register value. The spreading code is filtered using square-root raised Cosine Filter 255. This is followed by mixer 256, DAC 257, two up conversion stages 258, 259 before input to the RF stages 2510 and 2511.

FIG. 26 shows a 1024-4096 carrier of the OFDM 261 and the parallel MC-FMSS Communication System operating on guard band/pilot frequencies or a subset of the subcarriers.

FIG. 27A shows a conventional FDM 27A1, an Orthogonal Frequency Division Multiplex OFDM 27A2 with OFDM data subcarriers, and guard band 27A3 used by MCFMSS transeiver.

FIG. 27B shows the combined transmission of OFDM subcarriers and FMSS signals on a subset of subcarriers, where the OFDM band is designated by reference numeral 27B1, FMSS signals on guard band/pilot frequencies or subset of subcarriers are represented by reference numeral 27B2, and the combined transmission band is represented by reference numeral 27B3.

FIG. 28 shows an FM SS communication system with carrier hopping capability, the FM transceiver that utilizes a frequency-hopping system by transmitting the encoded data on several different subcarrier frequencies 288. Hopping from one frequency to another can be used to reduce the effect of interference. Typically, such a system may have many frequencies to choose from, and has several outputs produced by frequency hopping. The FM data is mixed with a carrier frequency 284. The carrier frequency is changed through a voltage to frequency converter 285 controlled by a DAC 287 and microprocessor 286. In addition a pilot frequency can be transmitted with the FM data and used to optimize receiver tuning. The FM system in FIG. 28 is shown transmitting on three different subcarrier locations at different time intervals.

FIGS. 29A and 29B together show a 4G communication system, according to the present invention. FIG. 29A shows the hardware associated with the base station DL-BS. FIG. 29B shows the hardware for uplink UL and downlink DL associated with the mobile terminal MT. The base station hardware incorporates the MC-DS-CDMA receiver 292, the OFDM transmitter 291, and the FM SS transceiver 293. The MT hardware incorporates the MC-DS-CDMA transmitter 295, the OFDMA receiver 294, and the FM SS transceiver 296.

FIG. 30 shows a simplified block diagram for a scheme that uses two-dimensional spreading of data in both the frequency and time domains for an OFDM down link, or for an FM SS system that modulates several parallel subcarriers. As shown in FIG. 30, the data 301 pass through serial to parallel converter 302, before modulation is applied at 303 to the parallel data streams. These parallel data streams are applied to frequencies selected by spreaders 304 and 306.

FIG. 31 shows a block diagram of the MC-FMSS mobile terminal. The hardware associated with the MC-FM SS mobile terminal comprises preprocessing circuit 311-313, followed by FM digital modulation 314, frequency space and time spreading 315, multi carrier transmitters (MCT) 316 and 317, data marker insertion 318 and 3110, digital-to-analog conversion (DAC) 319 and 3111, and RF stages FC3 and FC4. In the MC FM SS system as shown in FIG. 31, the Modulation Index of the FM output is controlled by digital circuits and DSP/Micro-Controller Software, and there are multiple transceivers that use multiple different Chipping Codes and multiple antennas.

FIG. 32 shows a block diagram of the MC-FMSS Base Station. As shown in FIG. 32, the hardware associated with the MC-FMSS base Station comprises ADC blocks 3218 and 3219, a processor 3217 which is fed data from ADC blocks 3218 and 3219, demodulator 3216, and the post processing circuits Carriers 1 and 2 (where are they shown in FIG. 32?) are used in the DL and carriers 3 and 4 are used in the Up Link. As shown in FIG. 32, channel estimation is performed by markers 328 placed on the transmitted carriers and fed to the OFDM System.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

BIBLIOGRAPHY

U.S. Pat. No. 7,864,900 B2, Al-Eidan.
U.S. Pat. No. 7,653,152 B2, Al-Eidan.
U.S. Pat. No. 7,027,505 B2, Al-Eidan.
U.S. Pat. No. 6,205,184 B1, Al-Eidan.
Edwin H. Armstrong, "A method of reducing disturbances in radio signaling by a system of frequency modulation," Proceedings of the institute of Radio Engineers, Vol. 24, No. 5, May 1936.
N. Yee, J. P. M. G. Linnartz and G. Fettweis, "Multi-Carrier CDMA in indoor wireless Radio Networks," IEEE Personal Indoor and Mobile Radio Communications (PIMRC) Int. Conference, September 1993, Yokohama, Japan, pp. 109-113 (1993) (first paper proposing the system and the name MC-CDMA).
K. Fazel and L. Papke, "On the performance of convolutionally-coded CDMA/OFDM for mobile communication system," IEEE Personal Indoor and Mobile Radio Communications (PIMRC) Int. Conference, September 1993, Yokohama, Japan, pp. 468-472.
A. Chouly, A. Brajal and S. Jourdan, "Orthogonal Multicarrier Techniques Applied to Direct Sequence Spread Spectrum CDMA Systems," in Proceedings of Global Telecommunications Conference (GLOBECOM'93), pp. 1723-1728, Houston, Tex., USA, November 1993.
N. Yee, J. P. M. G. Linnartz and G. Fettweis, "Multi-Carrier-CDMA in Indoor Wireless Networks," IEICE Transaction on Communications, Japan, Vol. E77-B, No. 7, July 1994, pp. 900-904.
J. P. M. G. Linnartz, "Performance Analysis of Synchronous MC-CDMA in Mobile Rayleigh Channels with Both Delay and Doppler Spreads," IEEE VT, Vol. 50, No. 6, November 2001, pp 1375-1387.
K. Fazel and S. Kaiser, *Multi-Carrier and Spread Spectrum Systems: From OFDM and MC-CDMA to LTE and WiMAX,* 2nd Edition, John Wiley & Sons, 2008, ISBN 978-0-470-99821-2.
Hughes Software Systems, Multi Carrier Code Division Multiple Access, March 2002.
German Aerospace Center, Institute of Communications and Navigation, *History of Multi-Carrier Code Division Multiple Access (MC-CDMA) and Multi-Carrier Spread Spectrum Workshop,* November 2006. Wireless Communication Reference Web Site, section about MC-CDMA, 2001.

What is claimed is:

1. A communication system configured to transmit a digital data on a plurality of subcarriers to be used in parallel with an OFDM (Orthogonal Frequency Division Multiplexing) system, comprising:
   a transmitter comprising:
   an analog-to-digital converter configured to receive an analog data and output the digital data;
   means for feeding the digital data to a modulator;
   the modulator configured to output the modulated data;
   a spreader configured to spread the modulated data into a plurality of frequencies;
   a plurality of PN (Pseudo-Noise) sequence generators configured to generate PN sequences, for further spreading of the spreaded modulated data; and
   means for RF upconversion and transmitting the further spreaded modulated data, and
   a plurality of transceivers, including a Multi Carrier Frequency Modulated Spread Spectrum System (MC FM SS) transceiver and a Variable Spreading Factor (VSF) transceiver, configured to use the PN sequences as a plurality of chipping codes on the spreaded modulated data carried by the same or different subsets of the plurality of subcarriers for the further spreading of the spreaded modulated data in time,
   wherein the MC FM SS and VSF transceivers operate concurrently using different subcarrier frequencies of the plurality of subcarriers,
   wherein the spreader is coupled with a spreading code generator,
   wherein the spreading code generator is configured to frequency modulate the plurality of frequencies for the spreader,
   wherein the plurality of subcarriers are a subset of orthogonal subcarriers and for adjacent or separated subcarriers, the same subcarriers are used interchangeably by the plurality of transceivers concurrently or sequentially for different system functions, and
   wherein the communication system is configured to carry out duplex communication with a base station while the OFDM system is in sleep mode, when a higher data rate OFDM channel is not required in the sleep mode.

2. The communication system according to claim 1, further comprising:
   a receiver configured to perform inversion operation of the transmitter to converting the data modulated by the transmitter to the analog data.

3. The communication system according to claim 1, wherein the modulator includes a CPFSK (Continuous Phase Frequency Shift Keying) modulator or a MSK (Minimum Shift Keying) modulator.

4. The communication system according to claim 1, wherein the plurality of transceivers perform two dimensional spreading of symbol data in frequency and time domains in sequence interchangeably and parallel with the OFDM system using pilot or guard ring subcarriers.

5. The communication system according to claim 1, wherein a size of the plurality of chipping codes matches with a bandwidth of the plurality of transceivers.

6. The communication system according to claim 1, wherein the modulator modulates the digital data on the plurality of subcarriers.

7. The communication system according to claim 1, wherein a DS (Direct Sequence) or frequency hopping technique is used to transmit the digital data on the plurality of subcarriers.

8. The communication system according to claim 1, wherein multi-user, duplex, wireless access is provided.

9. The communication system according to claim 1, wherein symbols are transmitted at the plurality of subcarriers, where each of the plurality of subcarriers is frequency modulated or phase encoded with the digital data using Quadrature Modulators.

10. The communication system according to claim 9, wherein the frequency modulation of the plurality of subcarriers is implemented based on a binary state or encoded with CPFSK (Continuous Phase Frequency Shift Keying).

11. The communication system according to claim 1, further comprising:
    a plurality of receivers configured to perform inversion operation of the transmitter to converting the data modulated by the transmitter to the analog data,
    wherein the plurality of receivers use non-coherent binary FSK (Frequency Shift Keying) demodulator and square law detector.

* * * * *